(12) United States Patent
Gamble et al.

(10) Patent No.: US 10,786,927 B2
(45) Date of Patent: Sep. 29, 2020

(54) HOLE FORMER WITH GASKET LOCATING FEATURES FOR CAST MANHOLE STRUCTURES

(71) Applicant: Press-Seal Corporation, Fort Wayne, IN (US)

(72) Inventors: Jimmy D. Gamble, Kendallville, IN (US); David Allen Krueckeberg, Decatur, IN (US)

(73) Assignee: Press-Seal Corporation, Fort Wayne, IN (US)

( * ) Notice: Subject to any disclaimer, the term of this patent is extended or adjusted under 35 U.S.C. 154(b) by 285 days.

(21) Appl. No.: 15/895,173

(22) Filed: Feb. 13, 2018

(65) Prior Publication Data

US 2018/0236688 A1     Aug. 23, 2018

Related U.S. Application Data

(60) Provisional application No. 62/460,949, filed on Feb. 20, 2017, provisional application No. 62/489,622, filed on Apr. 25, 2017.

(51) Int. Cl.
    *B28B 7/28*        (2006.01)
    *E02D 29/14*     (2006.01)
    (Continued)

(52) U.S. Cl.
    CPC .................. *B28B 7/28* (2013.01); *B28B 1/30* (2013.01); *E02D 29/125* (2013.01); *E02D 29/149* (2013.01); *F16J 15/108* (2013.01)

(58) Field of Classification Search
    CPC .. B28B 7/28; B28B 1/30; F16J 15/108; E02D 29/125; E02D 29/149
(Continued)

(56) References Cited

U.S. PATENT DOCUMENTS 3,727,876 A * 4/1973 Keyser ................ B28B 23/0043
                                                                         249/184
3,744,806 A     7/1973 Keyser
(Continued)

FOREIGN PATENT DOCUMENTS

EP         0 670 442       6/1995
WO     2002/090808   11/2002

OTHER PUBLICATIONS

European Search Report dated May 15, 2018 in corresponding EP Application No. 18157092.
(Continued)

*Primary Examiner* — Leith S Shafi
(74) *Attorney, Agent, or Firm* — Faegre Drinker Biddle & Reath LLP

(57) ABSTRACT

A hole former for use in casting a gasket within an opening of a structure of the type used in underground water systems, such as a manhole. The hole former includes a body defining a central axis and an outer peripheral surface, with at least one gasket retention element projecting radially outwardly from the outer peripheral surface to interface with a corresponding locating feature of the gasket. In this manner, axial shifting or movement of the gasket with respect to the hole former is restricted, thereby positively locating and retaining the gasket on the hole former before and during the casting process. The hole former may have a compound curvature, with the gasket retained around the periphery of the hole former in a compound curved configuration.

19 Claims, 25 Drawing Sheets

(51) Int. Cl.
  *B28B 1/30* (2006.01)
  *E02D 29/12* (2006.01)
  *F16J 15/10* (2006.01)

(58) Field of Classification Search
  USPC ................................................ 249/175–186
  See application file for complete search history.

(56) References Cited

U.S. PATENT DOCUMENTS

| | | | |
|---|---|---|---|
| 3,758,066 A | 9/1973 | Skinner et al. | |
| 3,759,285 A | 9/1973 | Yoakum | |
| 3,787,061 A * | 1/1974 | Yoakum | F16L 5/10 277/605 |
| 3,796,406 A * | 3/1974 | Ditcher | B28B 23/0043 249/11 |
| 3,813,107 A | 5/1974 | Ditcher | |
| 3,832,438 A | 8/1974 | Ditcher | |
| 3,874,063 A * | 4/1975 | Skinner | F16L 41/002 29/450 |
| 3,973,783 A | 8/1976 | Skinner et al. | |
| 4,103,901 A | 8/1978 | Ditcher | |
| 4,123,033 A * | 10/1978 | Joelson | B28B 7/0011 249/100 |
| 4,159,829 A | 7/1979 | Ditcher | |
| 4,333,662 A | 6/1982 | Jones | |
| 4,478,437 A * | 10/1984 | Skinner | F16L 5/10 24/20 EE |
| 4,625,976 A | 12/1986 | Gilbert | |
| 4,650,149 A | 3/1987 | Poulette et al. | |
| 4,693,482 A | 9/1987 | Daigle et al. | |
| 4,732,397 A | 3/1988 | Gavin | |
| 4,809,994 A | 3/1989 | Skinner et al. | |
| 4,854,543 A * | 8/1989 | Daigle | B28B 23/0043 249/95 |
| 4,916,799 A | 4/1990 | Skinner et al. | |
| 5,160,175 A | 11/1992 | Yang | |
| 5,171,507 A | 12/1992 | Del Zotto | |
| 5,217,237 A | 6/1993 | Westhoff et al. | |
| 5,248,154 A | 9/1993 | Westhoff et al. | |
| 5,286,040 A * | 2/1994 | Gavin | E03F 5/021 220/277 |
| 5,529,312 A | 6/1996 | Skinner et al. | |
| 5,601,291 A * | 2/1997 | Gavin | F16L 5/10 277/606 |
| 5,876,039 A | 3/1999 | Skinner et al. | |
| 5,941,535 A | 8/1999 | Richard | |
| 6,347,781 B1 | 2/2002 | Trangsrud | |
| 6,371,436 B1 | 4/2002 | Westhoff et al. | |
| 6,406,025 B1 | 6/2002 | Westhoff et al. | |
| 6,450,505 B1 * | 9/2002 | Gavin | E03F 5/021 249/39 |
| 6,460,860 B2 * | 10/2002 | Gavin | F16L 21/03 249/39 |
| 6,568,691 B1 | 5/2003 | Westhoff et al. | |
| 6,609,718 B1 | 8/2003 | Gavin | |
| 6,651,949 B1 * | 11/2003 | Westhoff | B28B 23/00 249/142 |
| 6,691,975 B1 * | 2/2004 | Gavin | E04G 15/061 249/10 |
| 6,779,239 B2 | 8/2004 | Kefalas et al. | |
| 7,028,972 B2 * | 4/2006 | Miller | B28B 23/0043 249/184 |
| 7,108,101 B1 * | 9/2006 | Westhoff | B28B 21/56 182/90 |
| 7,146,689 B2 | 12/2006 | Neuhaus et al. | |
| 7,263,746 B2 | 9/2007 | Neuhaus et al. | |
| 7,350,827 B2 * | 4/2008 | Zeigler | F16L 5/02 24/270 |
| 8,122,680 B2 | 2/2012 | Baur et al. | |
| 9,644,768 B2 * | 5/2017 | Skinner | F16L 41/002 |
| 2001/0052675 A1 | 12/2001 | Gavin | |
| 2003/0132578 A1 | 7/2003 | Nilsson | |
| 2003/0218304 A1 | 11/2003 | Westhoff et al. | |
| 2004/0222598 A1 * | 11/2004 | Skinner | F16L 5/10 277/606 |
| 2004/0222599 A1 | 11/2004 | Skinner | |
| 2005/0000644 A1 | 1/2005 | Corbett, Jr. | |
| 2005/0098961 A1 | 5/2005 | Skinner | |
| 2005/0167975 A1 | 8/2005 | Skinner | |
| 2006/0208480 A1 * | 9/2006 | Happel | B28B 23/0043 285/230 |
| 2009/0051125 A1 | 2/2009 | Skinner | |
| 2009/0278321 A1 | 11/2009 | Skinner | |
| 2016/0245436 A1 | 8/2016 | Monteil | |

OTHER PUBLICATIONS

Press Seal Gasket Corporation, Product Information for Cast-A-Seal, at least as early as Feb. 10, 2006.

Press Seal Gasket Corporation, Product Information for Cast-A-Seal 603, at least as early as Feb. 10, 2006.

\* cited by examiner

HOLE FORMER WITH GASKET LOCATING FEATURES FOR CAST MANHOLE STRUCTURES

CROSS REFERENCE TO RELATED APPLICATIONS

This application claims the benefit under Title 35, U.S.C. § 119(e) of U.S. Provisional Patent Application Ser. No. 62/460,949, filed on Feb. 20, 2017, and of U.S. Provisional Patent Application Ser. No. 62/489,622, filed on Apr. 25, 2017, each entitled HOLE FORMER WITH GASKET LOCATING FEATURES FOR CAST MANHOLE STRUCTURES, the disclosures of which are expressly incorporated by reference herein.

BACKGROUND OF THE INVENTION

1. Field of the Invention

The present invention relates to gaskets that are cast in place within the openings of structures such as manholes of the type used in underground water systems to provide a sealing connection between the manhole and a pipe that is connected to the manhole. In particular, the present invention relates to a hole former for supporting and locating a gasket with respect to a form structure during casting of the structure.

2. Description of the Related Art

Underground water systems, such as sewers and storm water systems, include underground structures such as manholes that are used to facilitate pipe junctions and to provide physical access points to the systems. These structures are typically made of concrete, and gaskets are used to seal connections between pipes and openings in the structures. In order to locate and support a gasket during casting of the gasket within an opening in the wall of the structure, a hole former, or casting mandrel assembly, is used. Hole formers have smooth, substantially cylindrical outer walls upon which an annular gasket is fitted to hold the gasket in place during the casting process by which the gasket is embedded within the cast structure.

One challenge with the foregoing construction is that it may be possible for the gasket to move or shift slightly with respect to the hole former, such as during the setup of the form structure and/or during the casting process due to the pouring or loading of the concrete, for example, potentially mislocating the gasket in the cast structure.

Additionally, if the cast structure is cylindrical, the wall in which the gasket is cast will be curved, such that the hole former itself may not be a geometric cylinder with straight, parallel end walls but rather may be shaped with a compound curvature. It is difficult to locate a cylindrical, annular gasket to conform to such hole formers as the inherent material properties of the flexible gasket tend to bias or return the gasket to its nominal cylindrical, annular shape.

What is needed is an improvement over the foregoing.

SUMMARY OF THE INVENTION

The present invention provides a hole former for use in casting a gasket within an opening of a structure of the type used in underground water systems, such as a manhole. The hole former includes a body defining a central axis and an outer peripheral surface, with at least one gasket retention element projecting radially outwardly from the outer peripheral surface to interface with a corresponding locating feature of the gasket. In this manner, axial shifting or movement of the gasket with respect to the hole former is restricted, thereby positively locating and retaining the gasket on the hole former before and during the casting process. The hole former may have a compound curvature, with the gasket retained around the periphery of the hole former in a compound curved configuration.

In one form thereof, the present invention provides a hole former for use in casting a gasket within an opening of a structure, including a body defining a central axis and including a substantially cylindrical outer peripheral surface having a length extending parallel to the central axis, the outer peripheral surface disposed at a first radial extent from the central axis; and at least one gasket retention element projecting outwardly beyond the outer peripheral surface to a second radial extent from the central axis, the second radial extent greater than the first radial extent.

The body of the hole former may include first and second opposite end faces disposed perpendicular to the central axis, the first and second end faces curved along concentric arcs defined by respective aligned radii extending from a common second axis perpendicular to the central axis.

The body of the hole former may include at least one gasket retention element interface, each gasket retention element associated with a corresponding gasket retention element interface.

At least one of the gasket retention element interfaces may include a hole in the substantially cylindrical outer peripheral surface, and at least one of the gasket retention elements may be an end of a spring clip, the end projecting through the hole outwardly beyond the outer peripheral surface to the second radial extent. At least one of the gasket retention element interfaces may include a pair of holes in the substantially cylindrical outer peripheral surface, and at least one of the gasket retention elements may be a pair of ends of a spring clip, the ends respectively projecting through the pair of holes outwardly beyond the outer peripheral surface to the second radial extent.

The hole former may further include an annular gasket received on outer peripheral surface, the gasket mechanically interfacing with a respective the gasket retention element, whereby movement of the gasket with respect to the outer peripheral surface of the hole former along a direction of the axis is restricted.

The gasket may include at least one recess engaging a respective gasket retention element, whereby movement of the gasket with respect to the outer peripheral surface of the hole former along a direction of the axis is restricted.

The hole former body may include an outer wall having a first diameter and defining the outer peripheral surface, the outer wall defining a stepped region having a second, lesser diameter than the first diameter, and the stepped region extending partially around the outer periphery of a lower portion of the hole former.

In another form thereof, the present invention provides a gasket and hole former assembly for use in casting a gasket within an opening of a structure, including a hole former, including a body defining a central axis and including a substantially cylindrical outer peripheral surface having a length extending parallel to the central axis, the outer peripheral surface disposed at a first radial extent from the central axis; and at least one gasket retention element projecting outwardly beyond the outer peripheral surface to a second radial extent from the central axis, the second radial extent greater than the first radial extent; and an annular gasket received on outer peripheral surface, the gasket mechanically interfacing with the gasket retention element, whereby movement of the gasket with respect to the outer peripheral surface of the hole former along a direction of the axis is restricted.

The gasket may include at least one recess engaging a respective gasket retention element, whereby movement of the gasket with respect to the outer peripheral surface of the hole former along a direction of the axis is restricted.

The body of the hole former may include first and second opposite end faces disposed perpendicular to the central axis, the first and second end faces curved along concentric arcs defined by respective aligned radii extending from a common second axis perpendicular to the central axis.

The body of the hole former may include at least one gasket retention element interface, each gasket retention element associated with a corresponding gasket retention element interface.

At least one of the gasket retention element interfaces may include a hole in the substantially cylindrical outer peripheral surface, and at least one of the gasket retention elements may be an end of a spring clip, the end projecting through the hole outwardly beyond the outer peripheral surface to the second radial extent. At least one of the gasket retention element interfaces may include a pair of holes in the substantially cylindrical outer peripheral surface, and at least one of the gasket retention elements may be a pair of ends of a spring clip, the ends respectively projecting through the pair of holes outwardly beyond the outer peripheral surface to the second radial extent.

The body of the hole former may include an outer wall having a first diameter and defining the outer peripheral surface, the outer wall defining a stepped region having a second, lesser diameter than the first diameter, and the stepped region extending partially around the outer periphery of a lower portion of the hole former.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplifications set out herein illustrate embodiments of the disclosure and such exemplifications are not to be construed as limiting the scope of the invention in any manner.

DETAILED DESCRIPTION

Figure 1:
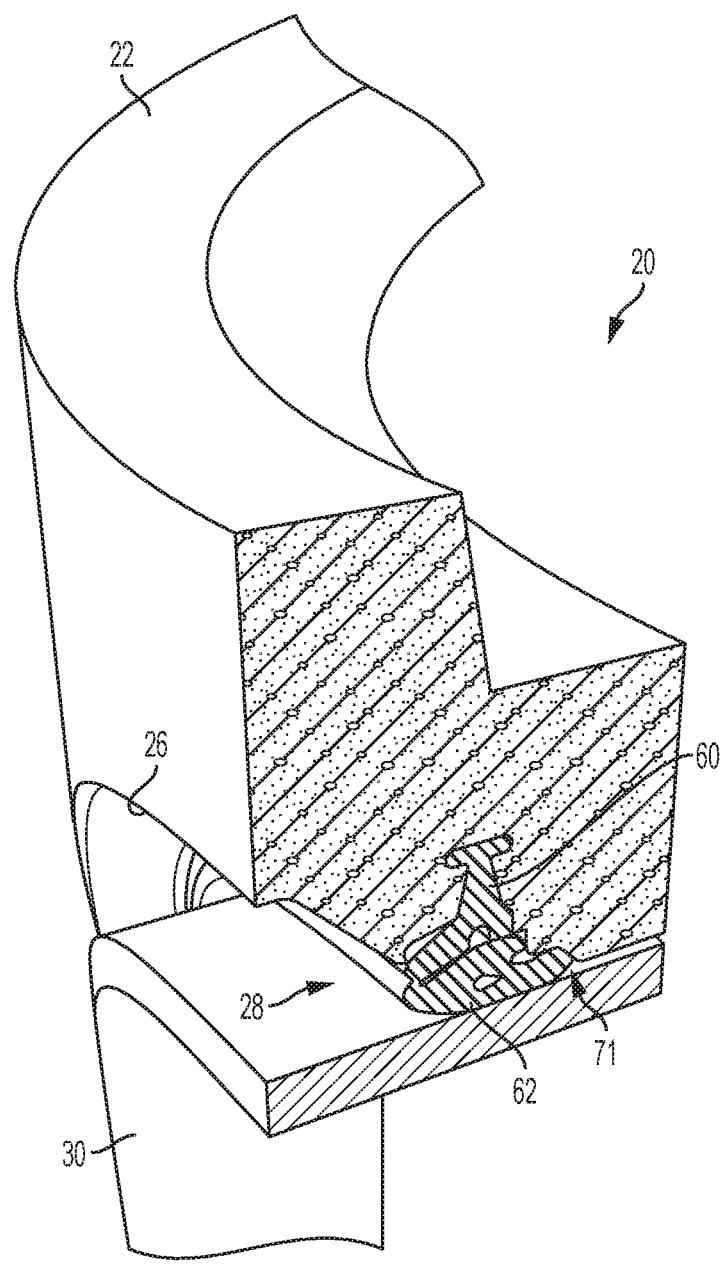
FIG. 1 is a partial sectional view of an underground structure including a gasket cast within an opening of the structure and forming a seal with a connecting pipe.

Referring to FIG. 1, a portion of an underground structure is shown as a manhole 20 of the type typically used with an underground water system such as sewer or storm water system, for example. Manhole 20 is made of a cast material, typically concrete, though may also be formed of other castable or settable materials such as rigid plastics, for example. Still further, manhole 20 may be made of a composite structure of incrementally layered material, such as fiberglass, for example.

Manhole 20 may have a cylindrical outer profile, as shown in FIG. 1, including a single, curved cylindrical vertical wall 22 together with a horizontal base wall and a riser assembly (not shown) extending upwardly from manhole 20 to street level grade. Alternatively, manhole 20 may include one or more flat vertical walls and/or a combination of flat walls and curved walls. Manhole 20 includes one or more openings 26 within its wall or walls within which an annular gasket 28 is cast, as described below.

Gasket 28 is used to form a watertight, sealing connection between the outer surface of a pipe 30 and the manhole 20. Exemplary gaskets for forming such sealing connections, as well as methods of casting such gaskets within concrete structures and effecting sealing connections between pipes and the structures using such gaskets are described in U.S. Pat. No. 4,916,799 and U.S. Patent Application Publication No. 2005/0167975, each assigned to the assignee of the present invention, the disclosures of each are expressly incorporated herein by reference.

Gasket 28 is made of a flexible, resilient and compressible material such as a natural or synthetic rubber or other synthetic polymeric materials such as thermoset polymers, for example. Typically, gasket 28 is produced by extruding the gasket as a linear cross-section, followed by cutting to a desired length, forming into an annular, cylindrical configuration, and sealing the opposite ends to one another via a heat set or splicing method. In this manner, gasket 28 has a nominal shape which is annular and cylindrical, and the inherent properties of the flexible, resilient material of gasket 28 will tend to return gasket 28 to its nominal annular, cylindrical shape whenever gasket 28 is deformed from such shape due to external forces.

Figure 2:
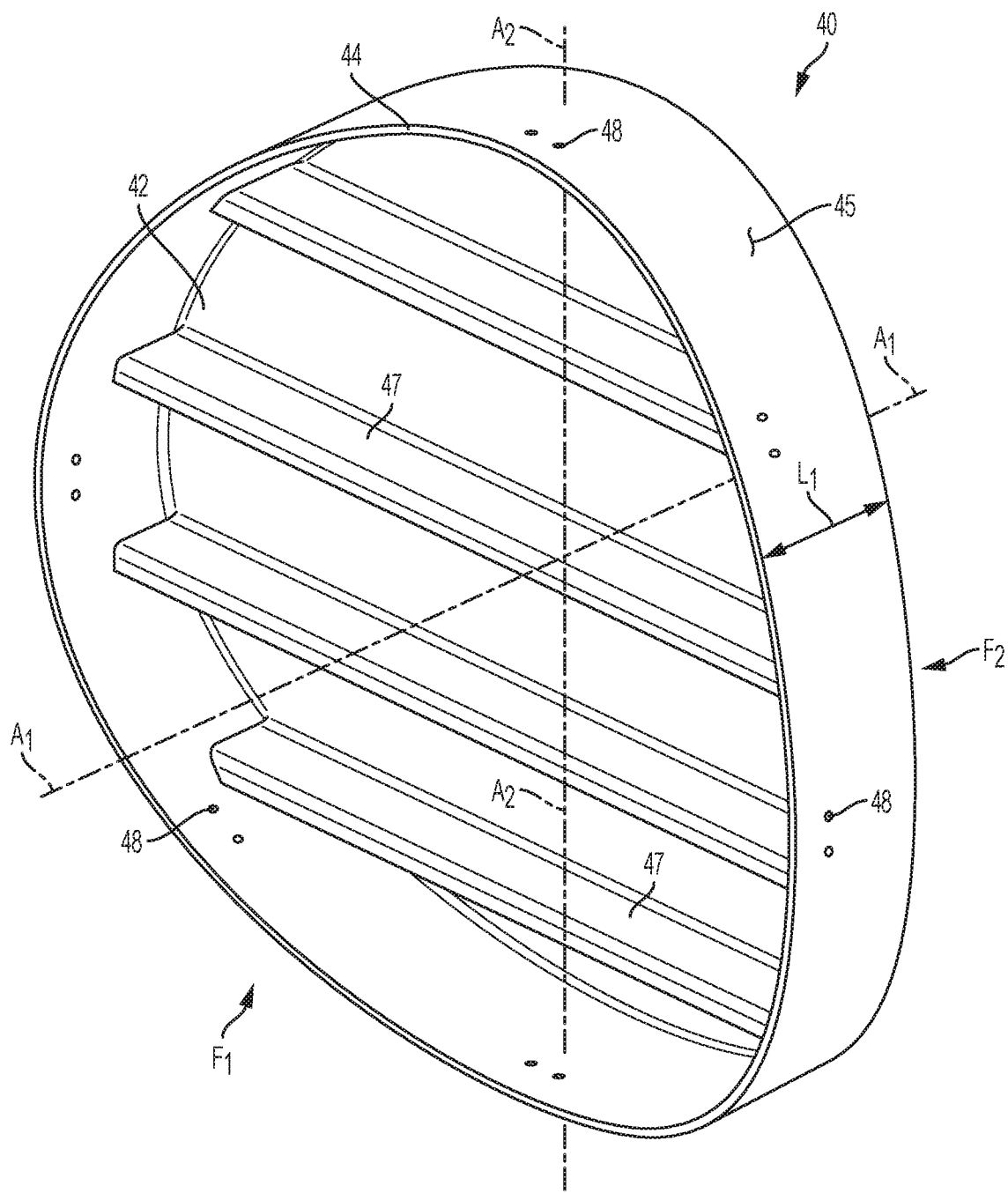
FIG. 2 is a first perspective view of a hole former.
Figure 3:
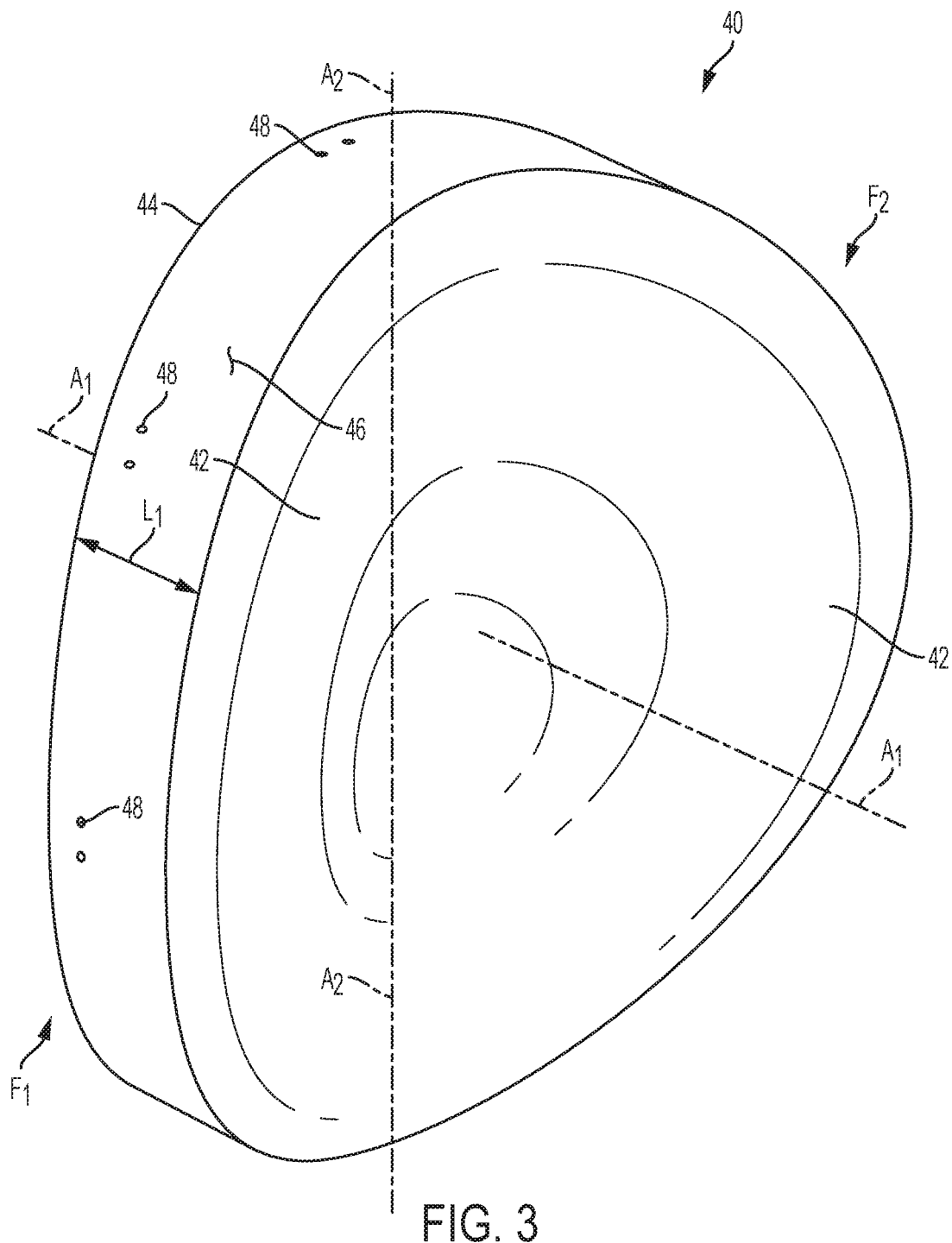
FIG. 3 is a second perspective view of the hole former of FIG. 2.

Referring to FIGS. 2 and 3, a hole former 40 according to the present invention is shown, which may be made of a rigid plastic material, fiberglass or a metal such as aluminum, for example. Hole former 40 generally includes a substantially cylindrical body 42 defining a central axis $A_1$ and including a substantially cylindrical outer wall 44 having an outer peripheral surface 46. Outer peripheral surface 46 has a length dimension $L_1$ extending substantially parallel to the central axis $A_1$ between first and second opposite faces $F_1$ and $F_2$, or ends, of body 42 of hole former 40. In some embodiments, outer wall 44 of hole former 40 may not be exactly cylindrical, but rather may be disposed at a small or shallow angle, such as less than 3 degrees, from central axis $A_1$, in order to facilitate removal of hole former from a form assembly after the casting process. This angle may be as little as 0.5 degree, 1 degree, or 3 degrees, or as great as 5 degrees, 7.5 degrees, or 10 degrees, or within any range defined between any two of the foregoing values, such as 0.5 to 10 degrees, 1 to 7.5 degrees, or 3 to 5 degrees, for example. Thus, as used herein, the term "substantially cylindrical" as used in connection with hole former 40 and its outer wall 44, encompasses cylindrical, i.e., parallel to central axis $A_1$, as well as any angle deviating from parallel to central axis $A_1$ by a relatively small or shallow angle, typically less than 10 degrees.

First and second opposite faces $F_1$ and $F_2$ are disposed perpendicular to central axis $A_1$. Hole former 40 may also include one or more support ribs 47, wherein the internal area of hole former 40 within outer wall 44 and between first and second opposite faces $F_1$ and $F_2$ may be substantially hollow for a weight reduction and/or material savings.

In one embodiment (not shown), first and second opposite faces $F_1$ and $F_2$ are straight and parallel to one another, such that hole former 40 is a "true" cylinder with straight, parallel opposite end faces. In this embodiment, hole former 40 may be used for forming and locating a gasket within an opening in a flat wall of a structure.

In another embodiment, as shown in FIGS. 2 and 3, hole former 40 may have compound curved shape. Specifically, in this embodiment, first and second opposite faces $F_1$ and $F_2$ are not straight but rather are curved along concentric arcs defined by aligned radii extending from a common second axis $A_2$ which is perpendicular to central axis $A_1$. In this embodiment, as described below and shown in FIGS. 2, 3, and 8-10, hole former 40 may be used for forming and locating a gasket within an opening in a curved wall of a structure. The curvature of hole former 40 with respect to the wall of a concrete structure is also seen in the horizontal sectional view of FIG. 8B, discussed below.

Hole former 40 also includes at least one gasket retention element interface defined within, or associated with, outer peripheral surface 46 of outer peripheral wall 44. In the embodiment shown in FIGS. 2-6, the gasket retention element interfaces include a plurality of holes 48 extending through outer peripheral wall 44 of hole former 40 which, as shown in FIGS. 2, 3, 5 and 6, may be arranged in pairs which are spaced incrementally about wall 44. Other types of gasket retention element interfaces and their associated gasket retention elements are discussed below with reference to FIGS. 11A-16.

As discussed herein, gasket retention elements are associated with the gasket retention interfaces of hole former 40 and, in use, project beyond the outer peripheral surface 46 of wall 44 of hole former 40. Stated otherwise, with outer peripheral surface 46 of wall 44 disposed at a first radial extent from central axis $A_1$ of hole former 40, the gasket retention elements project radially outwardly beyond the first radial extent of outer peripheral surface 46 to a second radial extent which is greater than the first radial extent. In this manner, as described below, the gasket retention elements are positioned to mechanically interfaced with and/or engage and positively locate a gasket with respect to the outer peripheral surface 46 hole former 40.

Figure 4:
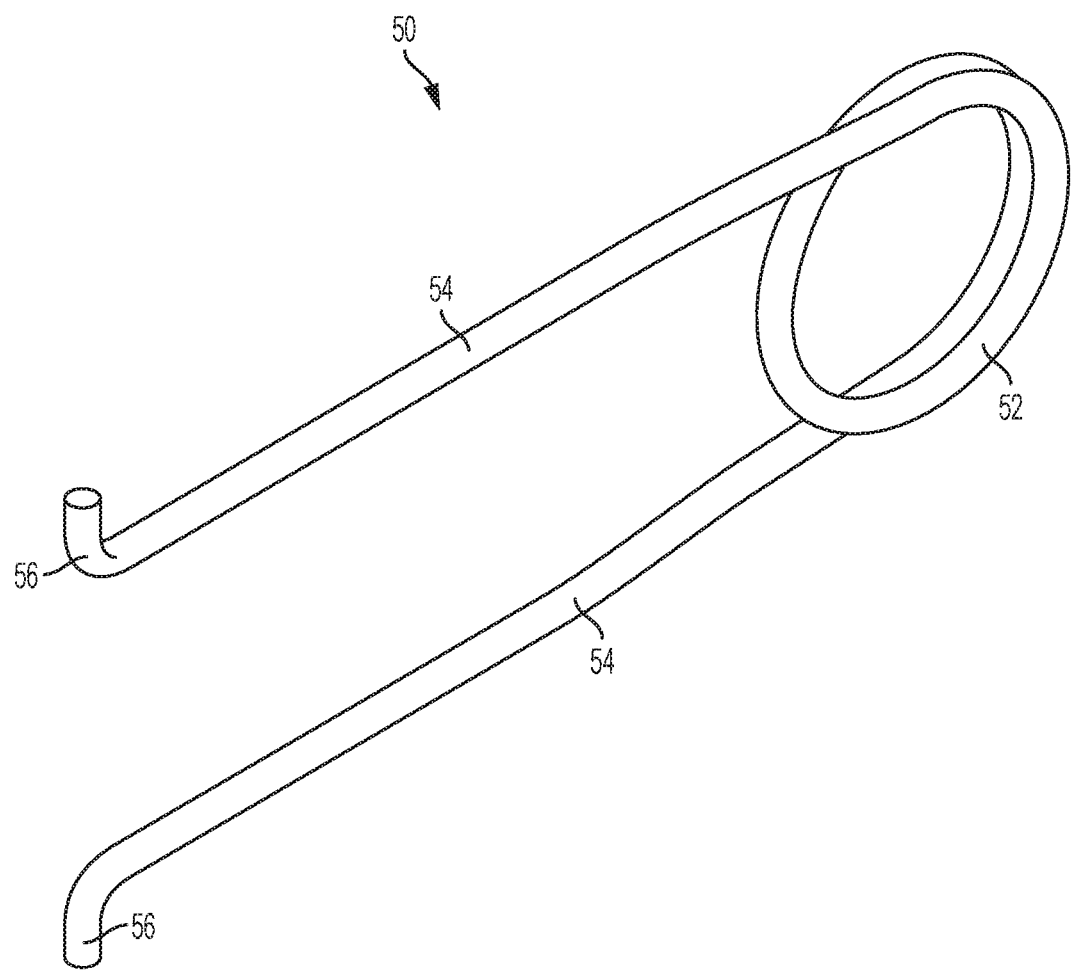
FIG. 4 is a perspective view of a spring clip.
Figure 5:
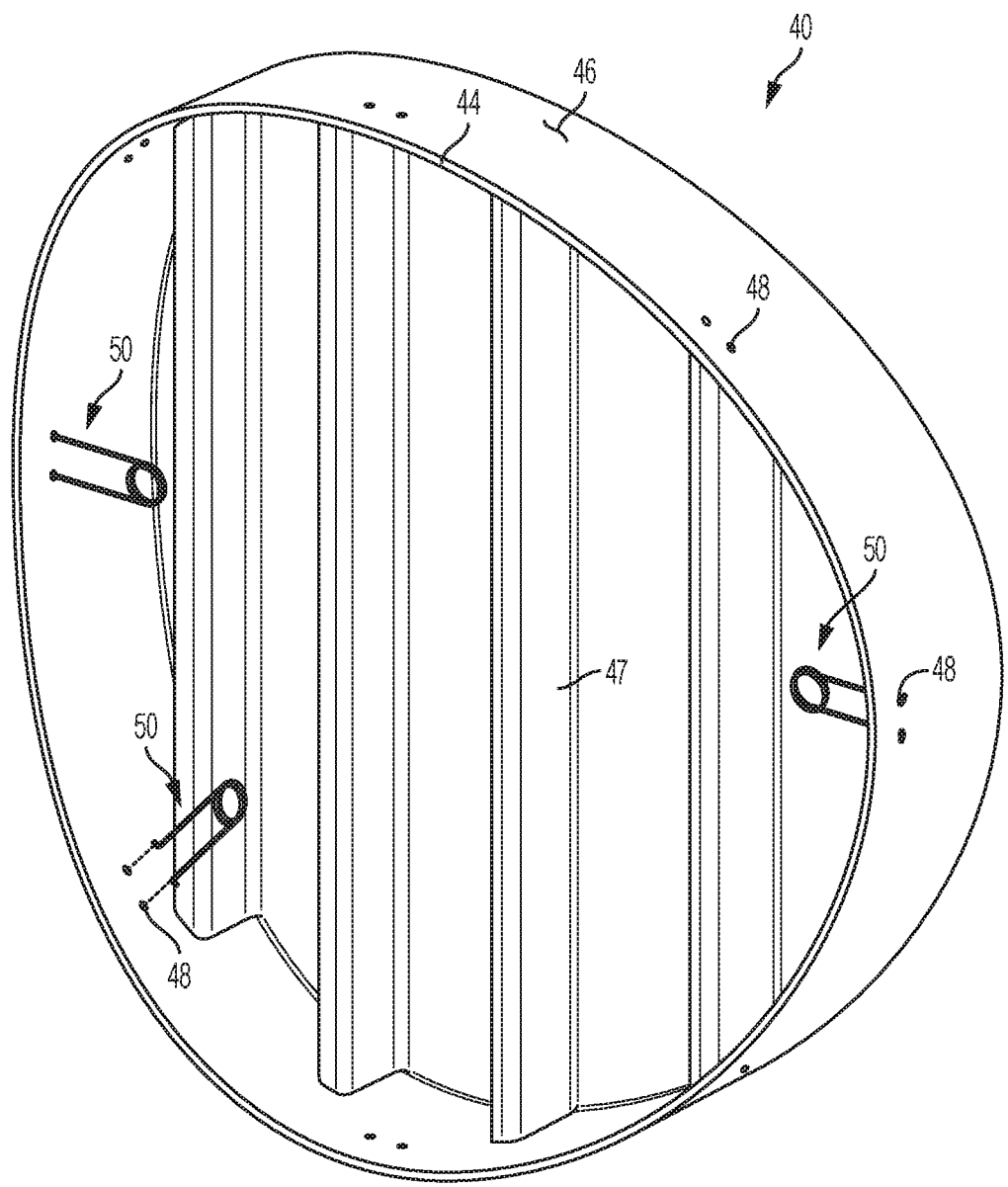
FIG. 5 is a perspective view of the hole former of FIGS. 2 and 3, illustrating the installation of the spring clips of FIG. 4.
Figure 6:
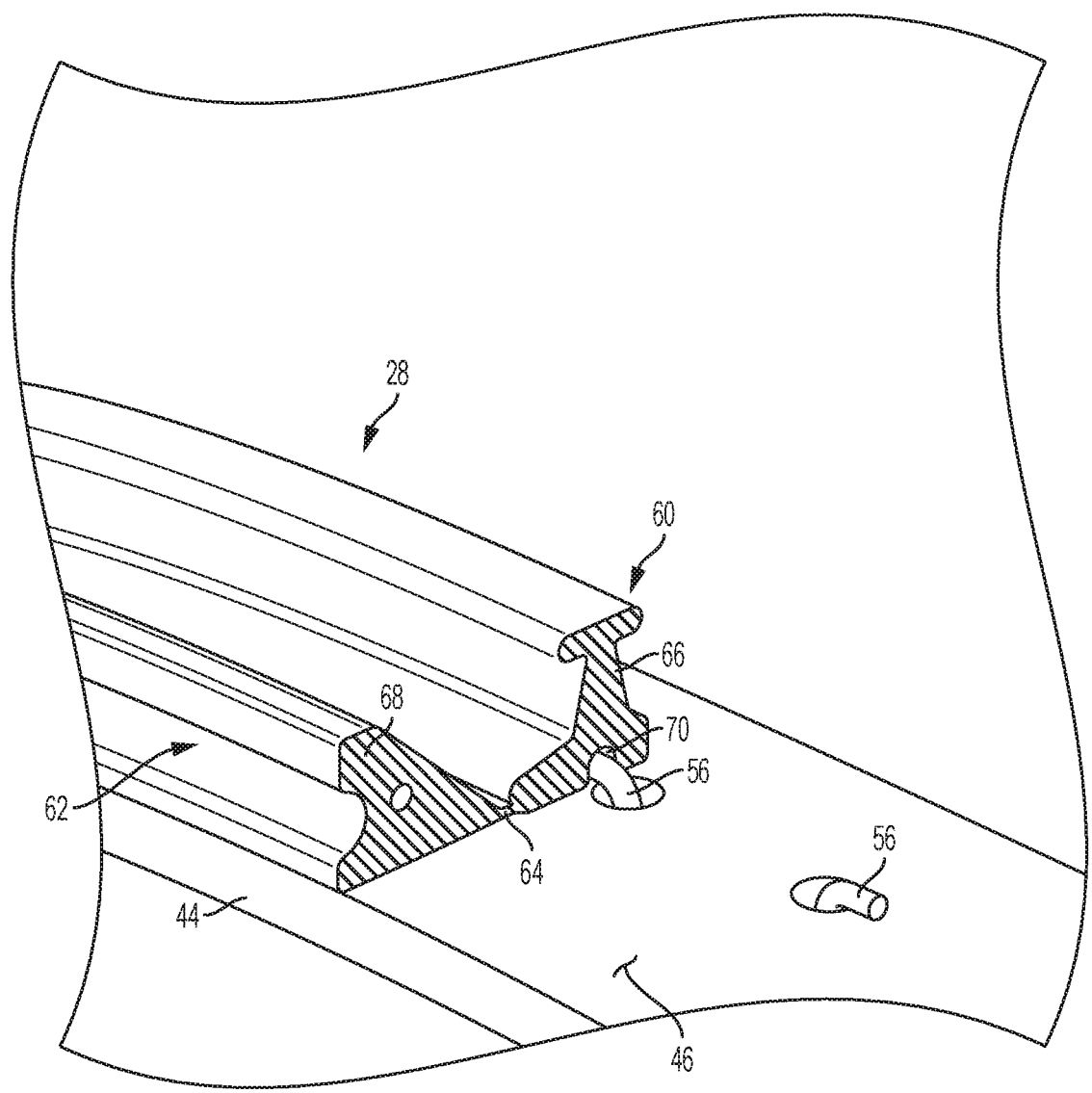
FIG. 6 is a partial sectional view of a portion of the hole former, with a gasket fitted over the hole former and showing engagement of ends of the spring clip within a annular recess of the gasket.

Referring to FIGS. 4-6, one exemplary gasket retention element is shown as a spring clip 50 made of spring steel, for example, and as shown in FIG. 4, includes an inner, coiled spring portion 52 and a pair of legs 54 including outer bent ends 56. As shown in FIG. 5, spring clips 50 may be connected to hole former 40 in the manner shown in FIG. 5, by which a user may grasp the legs of spring clip 50, initially inserting one of the leg ends through a hole 48 of a given pair, followed by inserting the other leg end of spring clip 50 through the adjacent hole 48 in the pair, while pressing legs together against the spring force of the coiled portion of the spring clip 50 as necessary during manipulation of the spring clip 50, followed by releasing the legs of the spring clip 50. After installation, as shown in FIG. 6, ends 56 of the legs project outwardly from outer peripheral surface 46 of wall 44 of hole former 40 to engage gasket 28 in the manner described below, while the remainder of each spring clip 50 remains disposed within the interior profile or volume of hole former 40, as shown in FIG. 5.

As shown in FIG. 6, gasket 28 generally includes an anchor portion 60 and a sealing portion 62 connected to one another by a flexible hinge portion 64. Anchor portion 60 generally includes an anchoring element 66 having a T-shaped cross section, for example, which is embedded within the cast material of manhole 20 to secure gasket 28 in place within the opening 26 of manhole 20. Sealing portion 62 includes a sealing lobe 68 which is deformable when contacted by a pipe to provide a sealing connection between gasket 28 and the outer surface of the pipe. One or both of the anchoring and sealing portions 60 and 62 of gasket 28 includes a feature corresponding to the gasket retention element, shown in FIG. 6 as a annular recess 70 in anchoring portion 60 of gasket 28 in which ends 56 of spring clip 50 are received. In this manner, as may be seen in FIG. 6, gasket 28 is positively mechanically retained or located with respect to outer peripheral surface 46 of hole former 40 and axial movement of gasket 28 along an axial direction parallel to central axis $A_1$ of hole former 40 is restricted.

Figure 7:
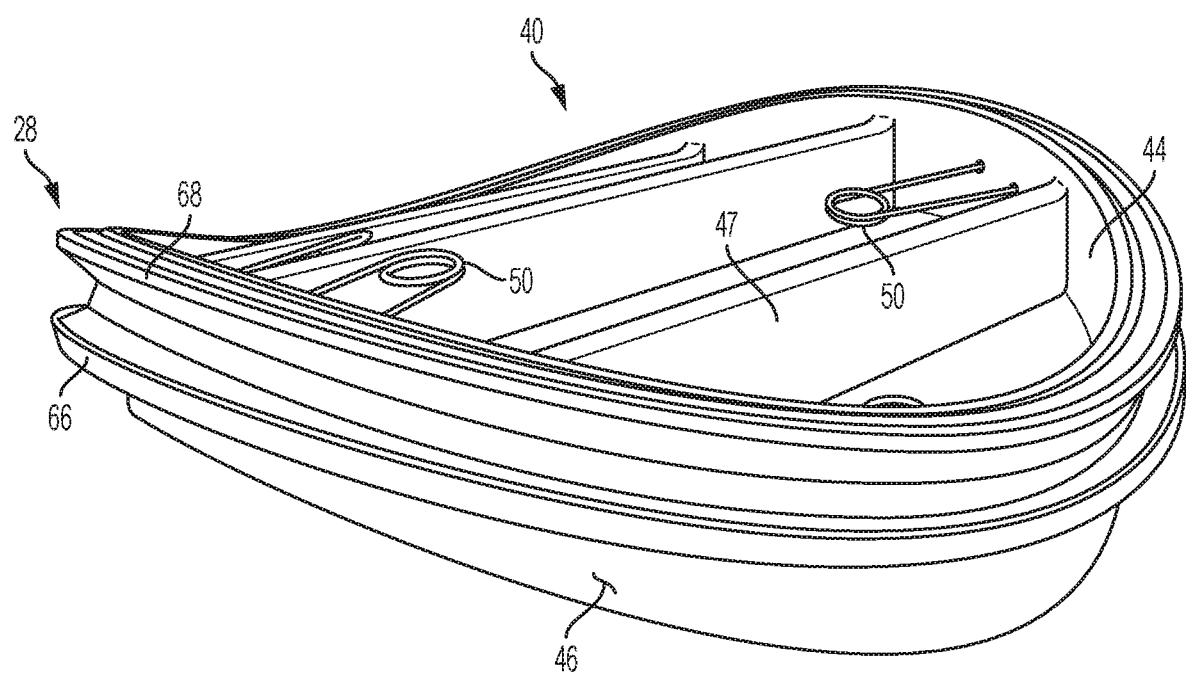
FIG. 7 is a perspective view of the hole former and gasket fitted over the hole former, showing the compound curved shape of the hole former and gasket.

Advantageously, as shown in FIG. 7, because the hole former 40 has a compound curvature as described above, the gasket 28 is retained by the gasket retention elements in a corresponding compound curvature configuration with follows or replicates the shape of the outer peripheral surface 46 of the hole former 40 against the inherent materials properties of the gasket 28 which would otherwise tend to return gasket to its nominal, annular cylindrical shape. In this manner, undesired movement of gasket 28 relative to hole former 40 is restricted during handing of hole former 40 and gasket 28 when installing same in a form structure to cast manhole 20, as well as during the casting process itself when hole former 40 and gasket 28 are exposed to the flow of concrete which might otherwise tend to shift the location of gasket with respect to hole former 40 and lead to the mislocation of gasket 28 within the opening 26 of the cast manhole 20.

Figure 8A:
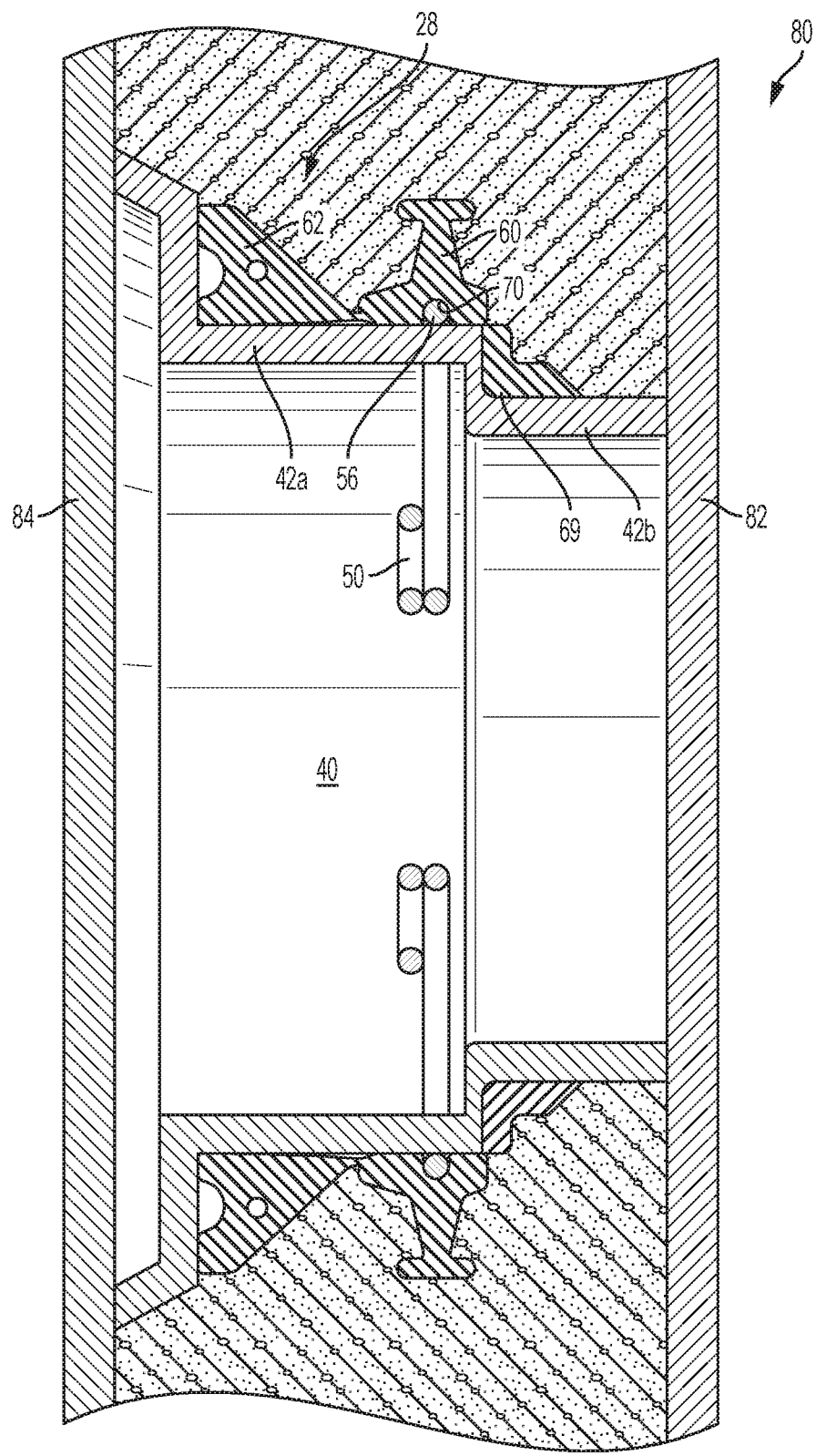
FIG. 8A is a vertical sectional view of the hole former and gasket mounted within a form assembly.
Figure 8B:
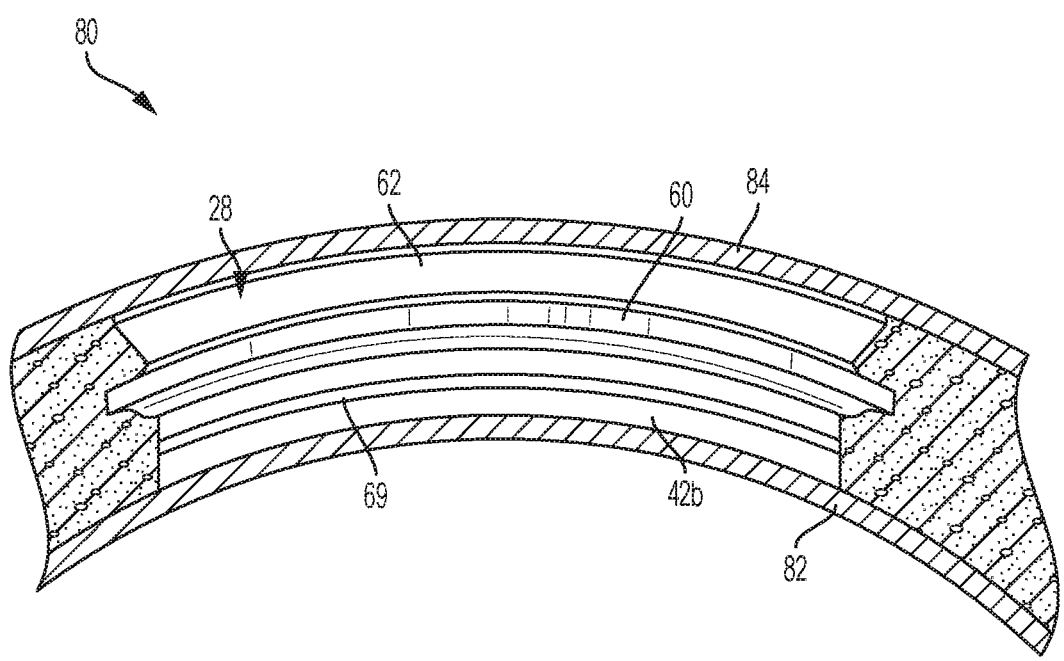
FIG. 8B corresponds to FIG. 8A, and is a horizontal sectional view of the hole former and gasket mounted within a form assembly.

Referring to FIGS. 8A and 8B, a form assembly 80 is shown which is used to cast manhole 20. When manhole 20 is cylindrical, the form assembly 80 includes curved, cylindrical inner and outer walls 82 and 84. After gasket 28 is mounted to hole former 40 in the manner described above, in which gasket 28 is positively retained with respect to hole former 40 by the gasket retention elements, hole former 40 and gasket 28 are placed between walls 82 and 84 with hole former 40 securely fastened to one or both of walls 82 and 84 via suitable fastening elements (not shown). Thereafter, the casting material, such as concrete, is poured between walls 82 and 84 to completely surround the outer peripheries of hole former 40 and gasket 28, followed by allowing the cast material to cure, wherein anchoring portion 60 of gasket 28 is securely embedded or anchored within the cast material.

Figure 9:
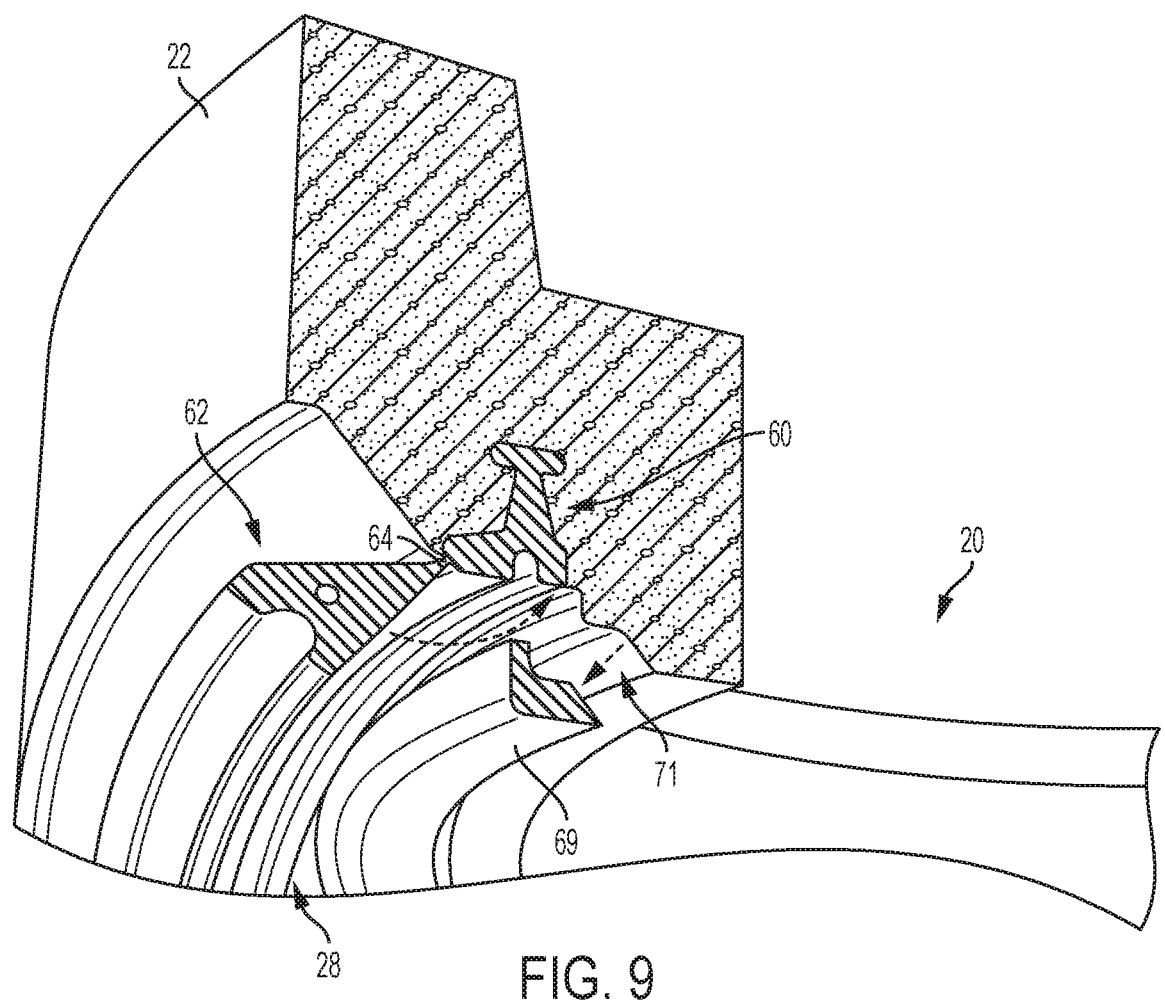
FIG. 9 is a sectional perspective view of the arrangement of FIG. 8A, with the form walls and hole former removed and showing the folding of the sealing portion of the gasket from a casting configuration to a sealing configuration.
Figure 10:
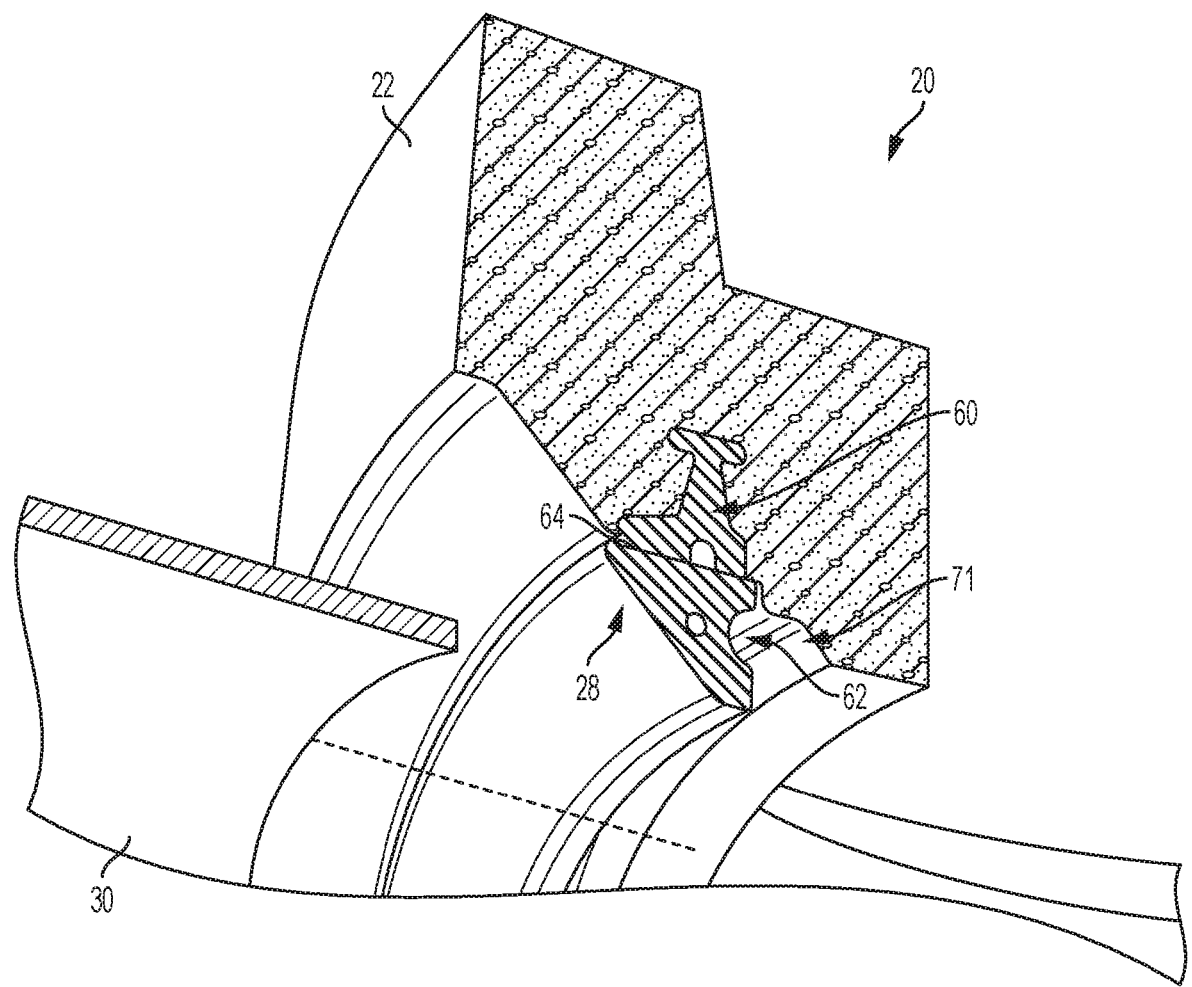
FIG. 10 is a sectional perspective view of the arrangement of FIG. 9, showing the sealing portion of the gasket folded into a sealing configuration, and further showing the approach of a pipe toward the gasket to form the sealed connection of FIG. 1.

Referring to FIGS. 9 and 10, the remaining steps are substantially similar to those described in the above-incorporated U.S. Pat. No. 4,916,799 and U.S. Patent Application Publication No. 2005/0167975. Briefly summarized, as shown in FIG. 9, after form walls 82 and 84 and hole former 40 are removed, sealing portion 62 of gasket 28 may be disengaged from the surrounding cast material and folded about hinge portion 64 of gasket 28 radially inwardly within opening adjacent anchoring portion 60. Thereafter, a pipe 30 may be inserted through the inner periphery of gasket 28 as shown in FIG. 10 to contact sealing portion 62 with sealing lobe 68 and/or anchoring portion 60 compressed and deformed in the manner shown in FIG. 1 to provide a watertight, sealed connection between gasket 28 and the outer surface of the pipe 30.

As also shown in FIG. 8A, hole former 40 may optionally have a stepped configuration wherein body 42 thereof includes first and second, substantially co-cylindrical and co-axial portions 42a and 42b having a relatively greater outer diameter and a relatively lesser outer diameter, respectively. During casting, as shown in FIG. 8A, an optional casting ring 69, made of either a rigid or flexible material, may be fitted over portion 42b of hole former 40 and which, when removed as shown in FIG. 9 during the stripping of the form structure after casting, reveals an annular relief space 71 which, as shown in FIGS. 1 and 10, provides an expansion area into which sealing portion 62 of gasket 28 may be compressed when engaged by a pipe 30 in the manner shown in FIG. 1. Additionally, relief space 71 allows for a limited extent of axial deflection of pipe 30 away from its nominal orientation, in which pipe 30 is disposed perpendicular to wall 22 of manhole 20, due to loading or shifting in the soil in which pipe 30 and manhole 20 are buried.

FIGS. 11A-16 illustrate alternative embodiments of hole formers including alternative gasket retention elements. In FIGS. 11A-16, except as described below, the hole former is substantially similar to that described above, and identical reference numerals are used to identify identical or substantially identical elements therebetween.

Figure 11A:
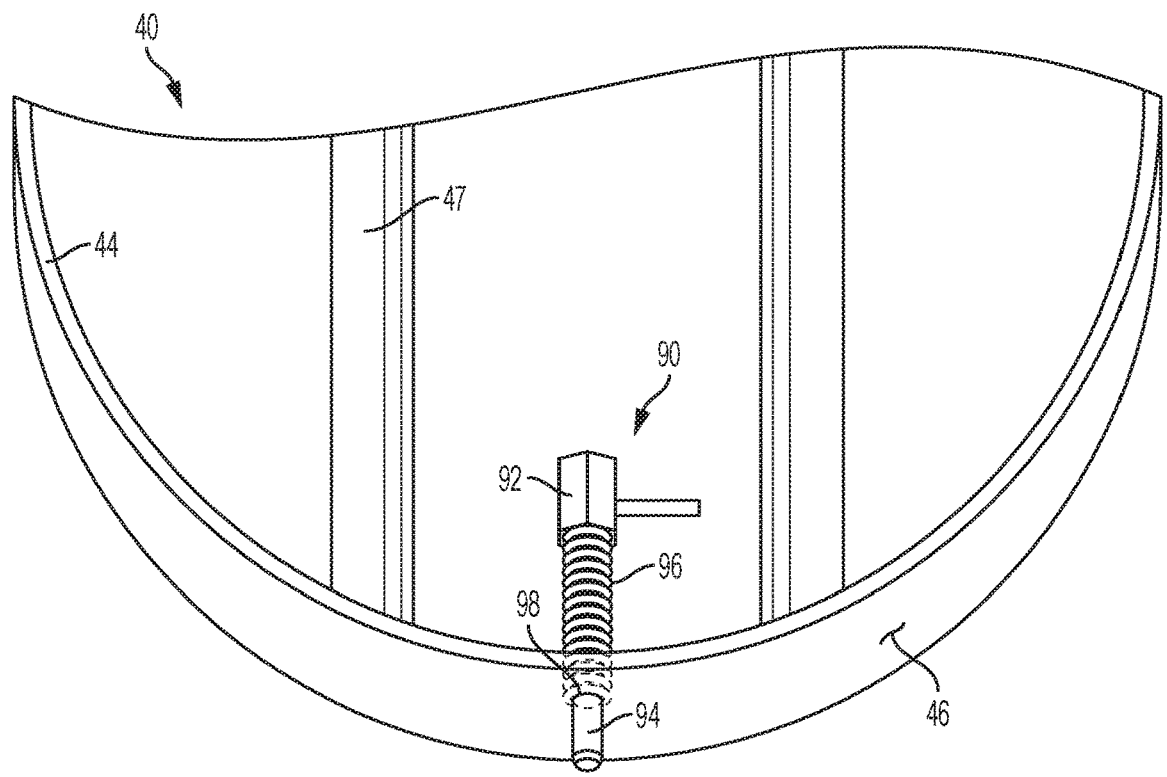
FIG. 11A is first fragmentary perspective view of a hole former according to an alternate embodiment, showing a gasket retention element in the form of a plunger device including a plunger element in an extended position.
Figure 11B:
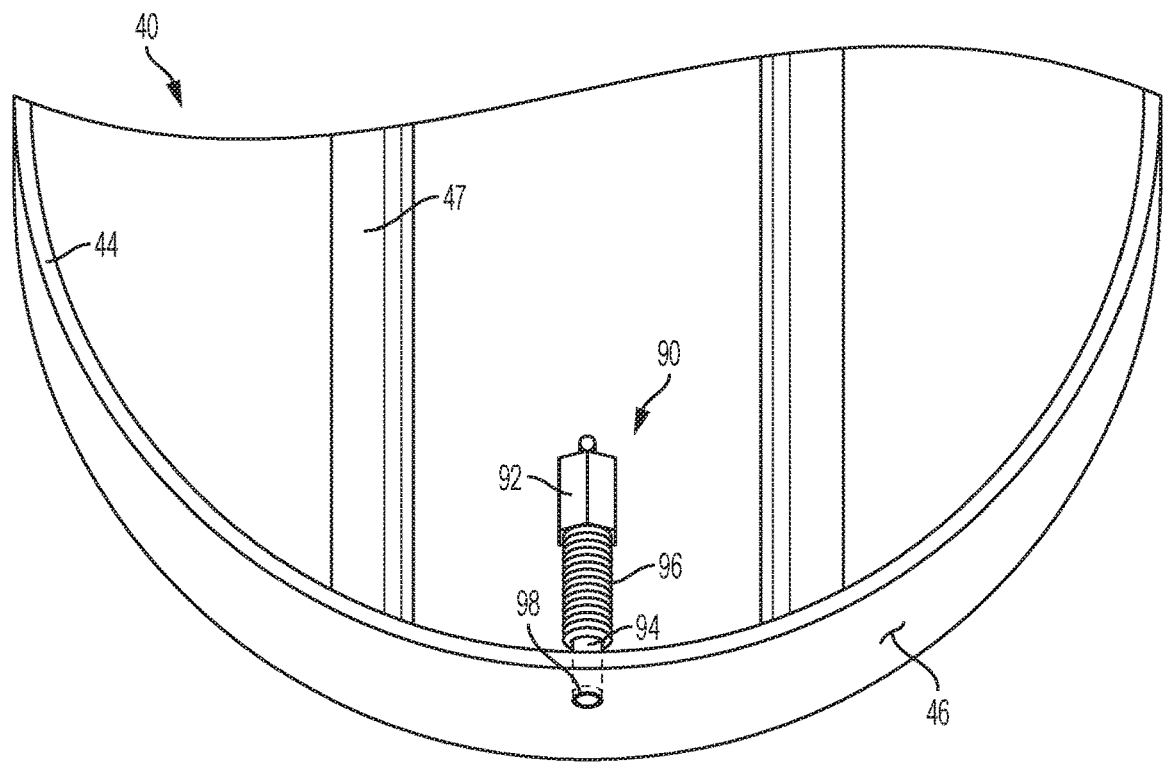
FIG. 11B is a second fragmentary view of the hole former of FIG. 11A, showing the plunger element in a retracted position.

Referring to FIGS. 11A and 11B, the gasket retention elements may be configured as one or more plunger devices 90 connected to hole former 40. Each plunger device 90 includes a plunger body 92 and a plunger element 94 slideably disposed within the plunger body 92 and which may be biased by a spring 96 into either an extended position (FIG. 11A) or a retracted position (FIG. 11B).

In use, the plunger elements 94 are moved to extended positions, shown in FIG. 11A, in which the ends of plunger elements 94 project though holes 98 in wall 44 outwardly beyond the outer peripheral surface 46 of wall 44 to engage with a corresponding feature in gasket 28, such as annular recess 70 (FIG. 6) during casting. After the gasket 28 is cast within opening 26 in manhole 20, hole former 40 may be separated from gasket 28 by retracting the plunger elements 94, followed by removing hole former 40 from gasket 28.

Figure 12A:
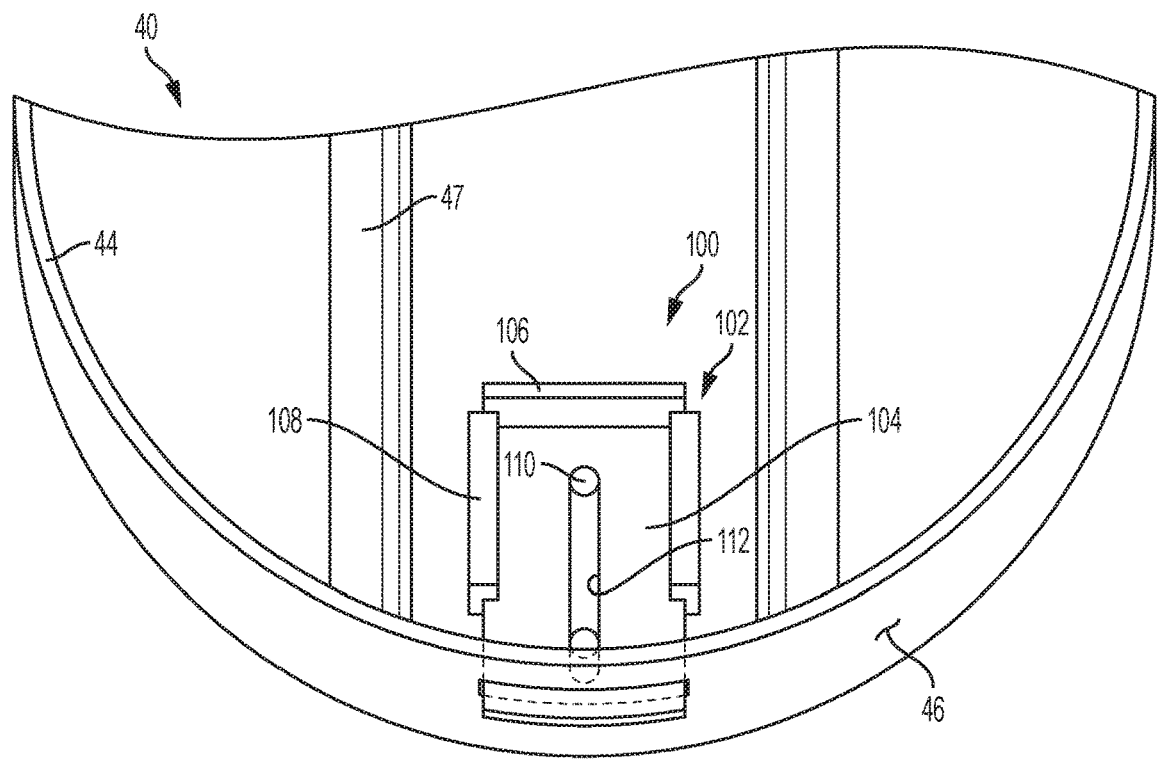
FIG. 12A is first fragmentary perspective view of a hole former according to an alternate embodiment, showing a gasket retention element in the form of a blade/slide device including a blade in an extended position.
Figure 12B:
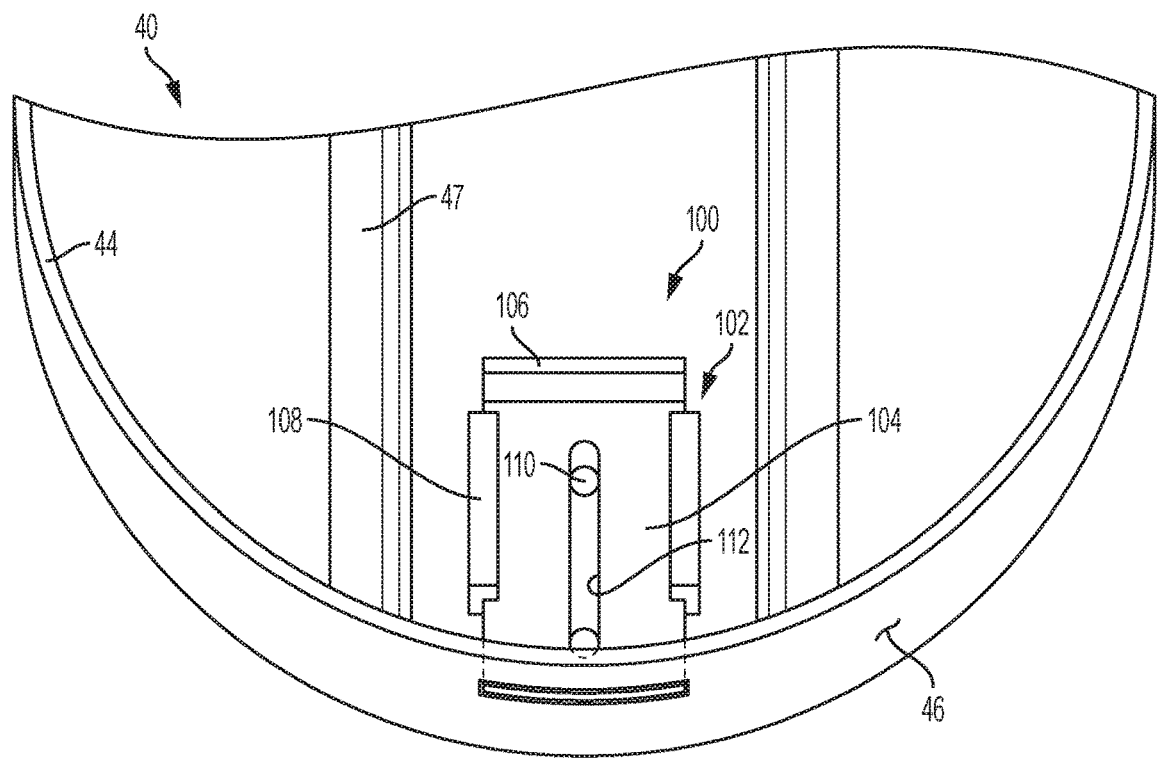
FIG. 12B is a second fragmentary view of the hole former of FIG. 12A, showing the blade in a retracted position.

In FIGS. 12A and 12B, the gasket retention elements may be configured as blade/slide device 100, including an L-shaped blade 102 including body portion 104 and handle 106, which is frictionally and slideably captured within a pair of rails 108, with movement of blade 102 between an extended position (FIG. 12A) and a retracted position (FIG. 12B) limited by a pair of guide pins 110 of hole former 40 received within slot 112 of body portion 104 of blade 102.

In use, the blades 102 are moved to extended positions, shown in FIG. 12A, in which the ends of blades 102 project outwardly through slots 112 in wall 44 beyond the outer peripheral surface 46 of wall 44 to engage with a corresponding feature in gasket 28, such as annular recess 70 (FIG. 6) during casting. After the gasket 28 is cast within opening 26 in manhole 20, hole former 40 may be separated from gasket 28 by retracting blades 102, followed by removing hole former 40 from gasket 28.

Figure 13A:
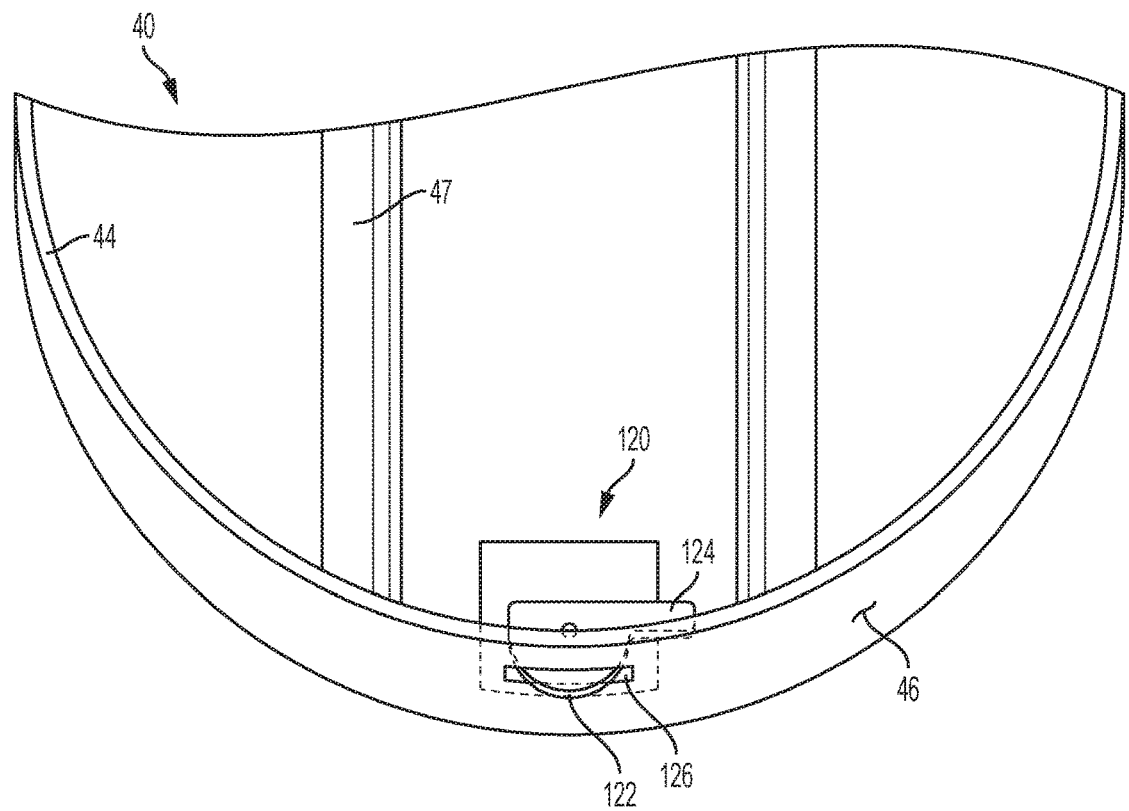
FIG. 13A is first fragmentary perspective view of a hole former according to an alternate embodiment, showing a gasket retention element in the form of a cam member including a cam portion in an extended position.
Figure 13B:
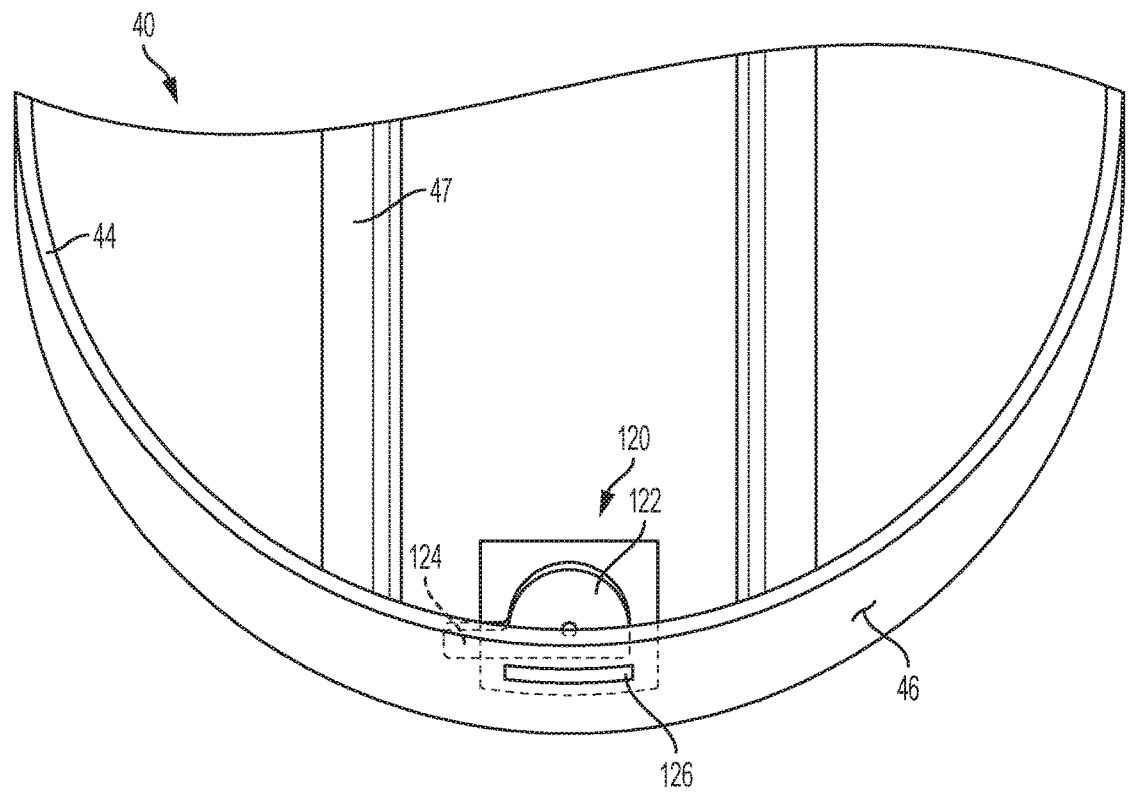
FIG. 13B is a second fragmentary view of the hole former of FIG. 13A, showing the cam portion in a retracted position.

In FIGS. 13A and 13B, the gasket retention elements may be configured as pivot cam members 120 rotationally mounted to the interior of hole former 40, including cam portions 122 and handle portions 124. Cam members 120 are rotationally movable between an extended position (FIG. 13A) and a retracted position (FIG. 13B).

In use, cam members 120 are moved to their extended positions, shown in FIG. 13A, in which cam portions 122 project though slots 126 in wall 44 outwardly beyond the outer peripheral surface 46 of wall 44 to engage with a corresponding feature in gasket 28, such as annular recess 70 (FIG. 6) during casting. After the gasket 28 is cast within opening 26 in manhole 20, hole former 40 may be separated from gasket 28 by moving cam members 120 to their retracted positions, followed by removing hole former 40 from gasket 28.

Figure 14A:
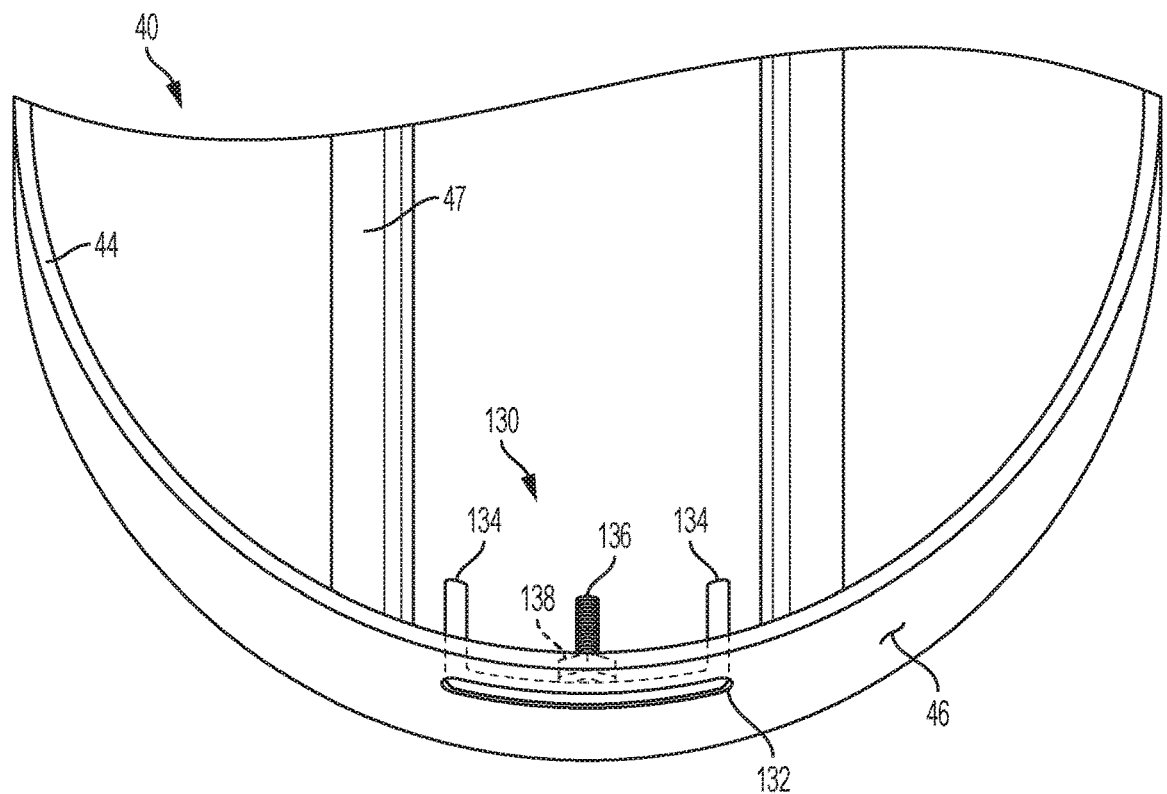
FIG. 14A is first fragmentary perspective view of a hole former according to an alternate embodiment, showing a gasket retention element in the form of bar in an extended position.
Figure 14B:
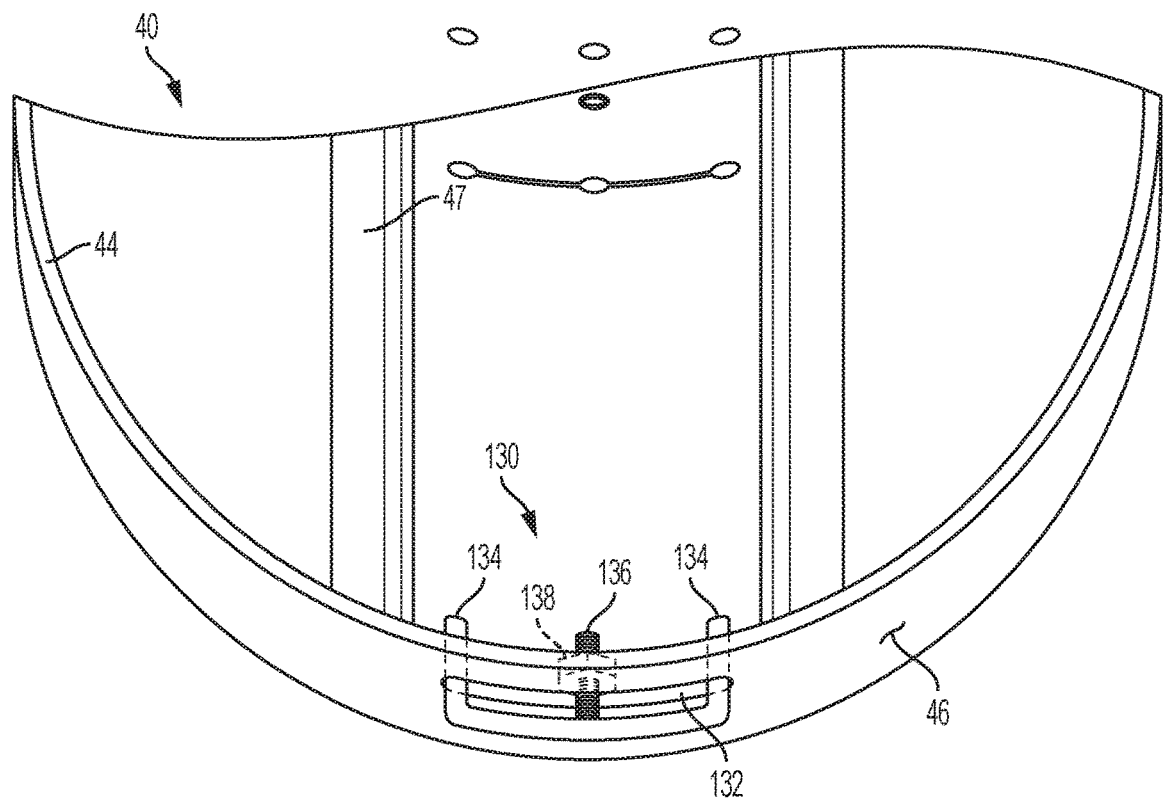
FIG. 14B is a second fragmentary view of the hole former of FIG. 14A, showing the bar in a retracted position.

Referring to FIGS. 14A and 14B, the gasket retention elements may be configured as E-shaped bars 130 received within corresponding slots 132 in outer wall 44 of hole former 40. End legs 134 of bars 130 are disposed adjacent the ends of slot 132, while central leg 136 of bar 130 is threaded and receives an adjustable nut 138. In a first, extended position shown in FIG. 14A, nut 138 is threaded to a relatively greater extent onto central leg 136 such that bar 130 protrudes outwardly of outer peripheral surface 46 of wall 44 to engage with a corresponding feature in gasket 28, such as annular recess 70 (FIG. 6) during casting. After casting, nut 138 is adjusted to a second, retracted position, shown in FIG. 14B, in which nut 138 is threaded to a relatively lesser extend onto central leg 136 such as bar 130 is received within slot 132 or interiorly of outer peripheral surface 46 of wall 44.

Figure 15:
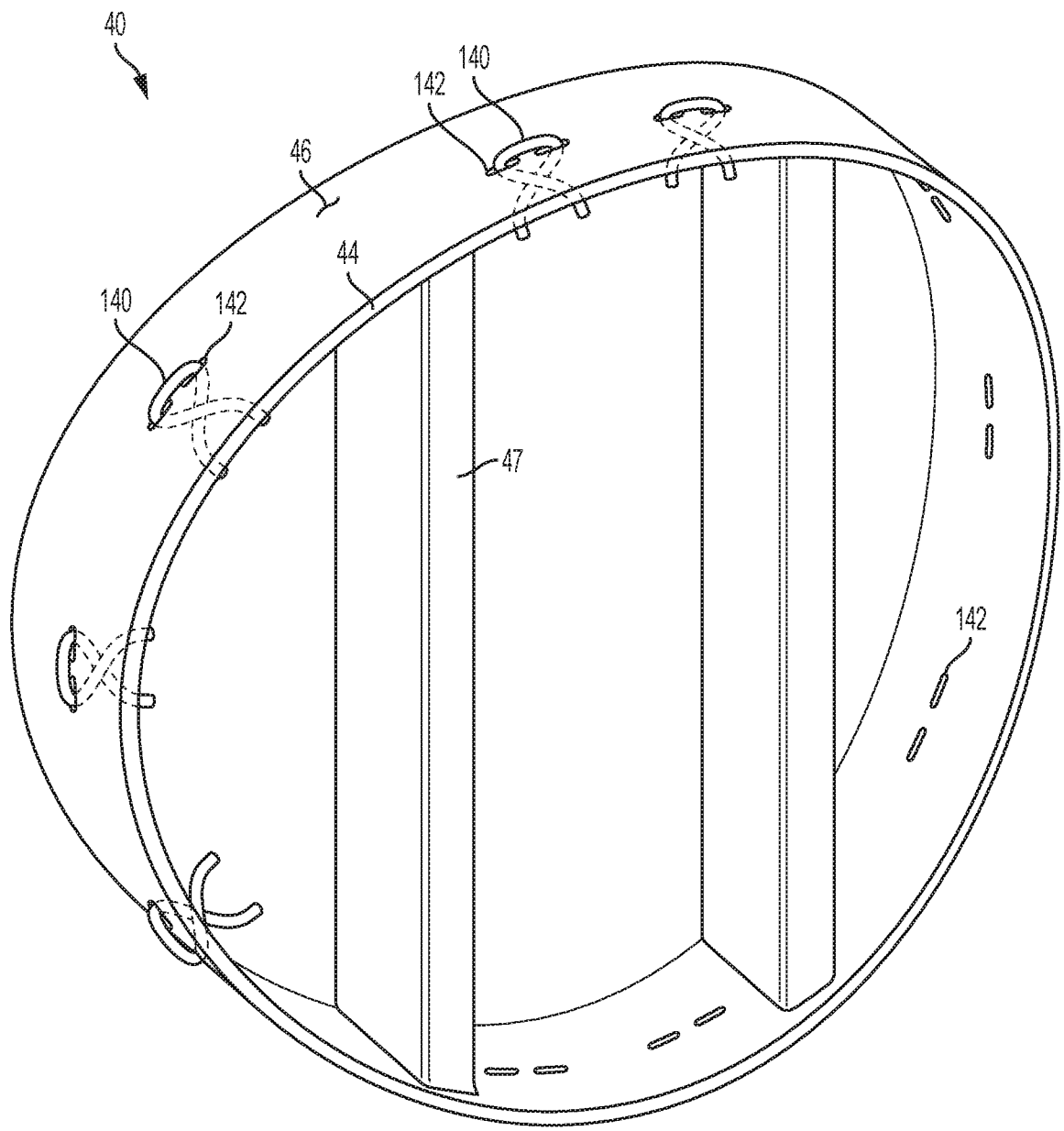
FIG. 15 is a perspective view of a hole former according to an alternate embodiment, showing gasket retention elements in the form of rope pieces.

Referring to FIG. 15, gasket retention elements may be configured as separate pieces of rope 140 or cording received in a looped manner through respective pairs of spaced holes 142 of hole former 40 such that segments of rope 140 project beyond the outer peripheral surface 46 of wall 44 to engage with a corresponding feature in gasket 28, such as annular recess 70 (FIG. 6) during casting. The ends of the rope pieces 140 may be tied to one another to secure them in place. After casting, the ends of rope pieces 140 may be untied, followed by pulling the rope pieces 140 through holes 142 to disengage them from hole former 40, allowing hole former 40 to be separated from gasket 28.

Figure 16:
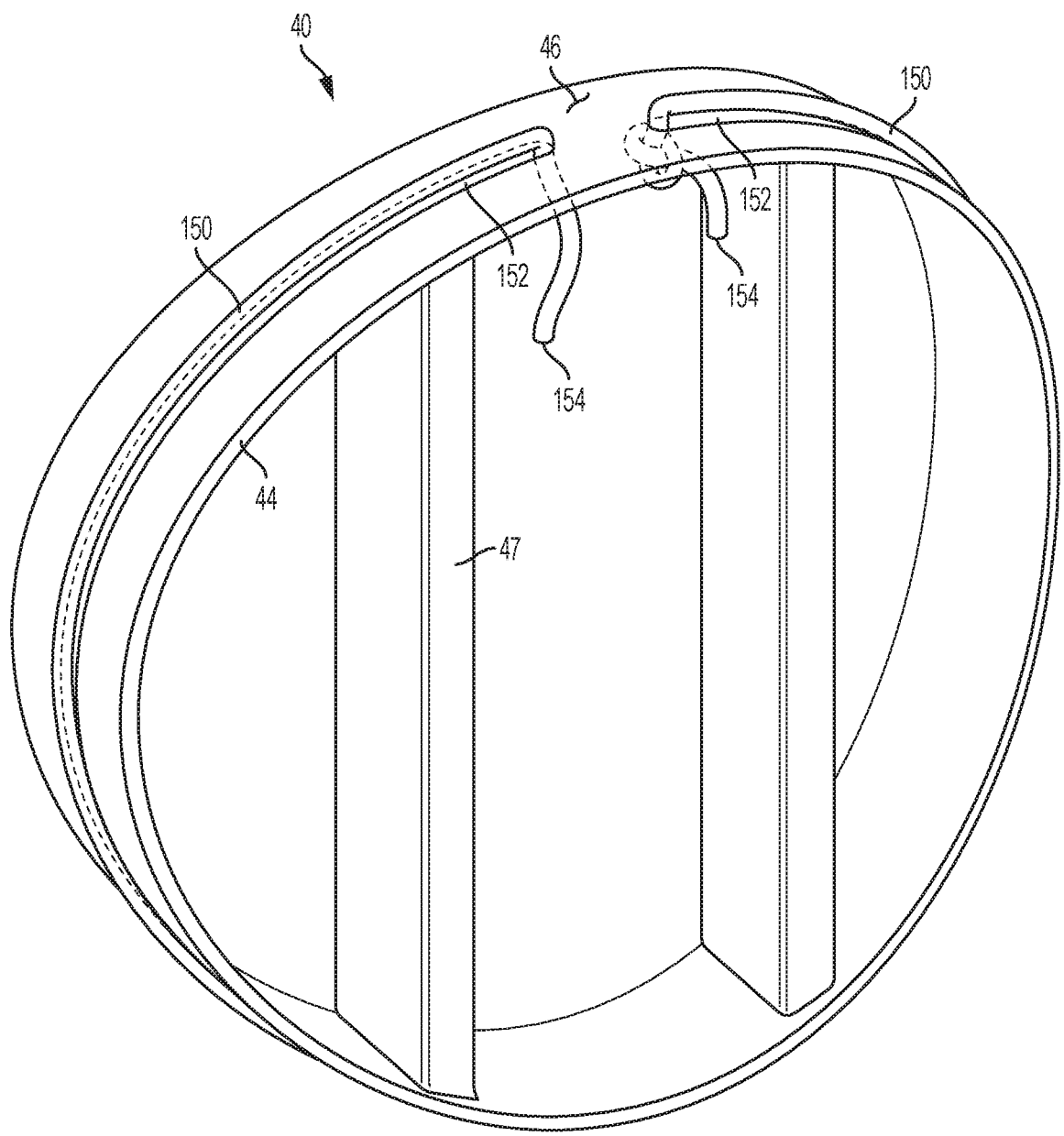
FIG. 16 is a perspective view of a hole former according to an alternate embodiment, showing a gasket retention element in the form of a length of rope disposed within a groove.

Referring to FIG. 16, a gasket retention element may be configured as a length of rope 150 received in a groove 152 extending substantially around the entire outer peripheral surface 46 wall 44 to engage with a corresponding feature in gasket 28, such as annular recess 70 (FIG. 6) during casting. Ends 154 of rope 150 may be tied in respective knots or to one another during casting to secure rope 150 in place. After casting, the knots of the rope ends may be untied, or the rope ends untied from one another, followed by pulling of one end of rope 150 inwardly through one end of groove 152 to separate rope 150 from hole former 40, allowing hole former 40 to be removed from gasket 28.

In the embodiments of FIGS. 15 and 16, other elongate, flexible materials may be used in place of rope 140 or cording to achieve the same effect, such as electrical wire, chain, cable, solid core, stranded wire rope (bare or jacketed with insulation), hollow or solid core pliable plastic, rubber, or composite material strapping or rods.

Figure 17:
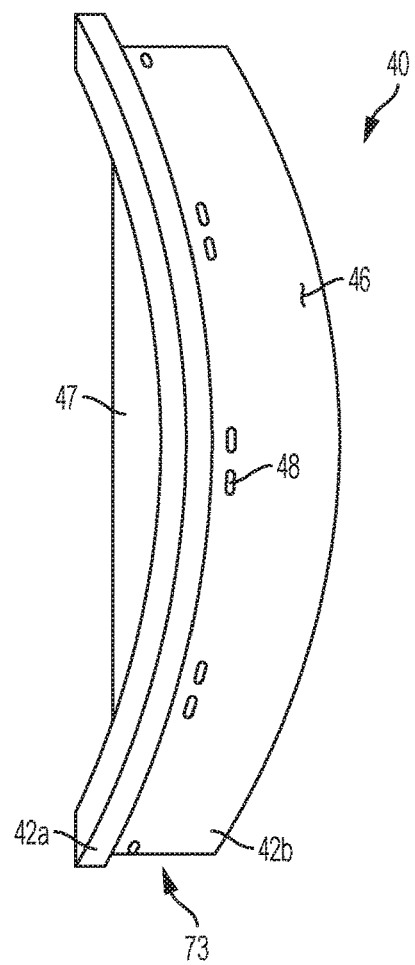
FIG. 17 is a perspective view of a hole former according to a further embodiment.
Figure 18:
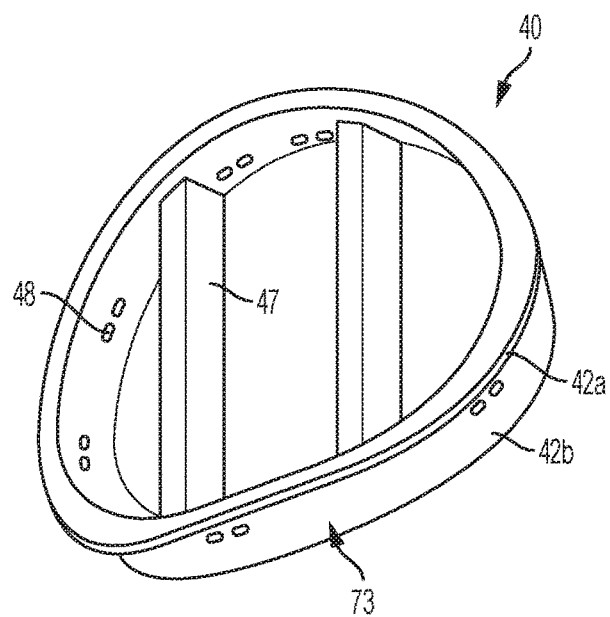
FIG. 18 is a side view of the hole former of FIG. 17.

Referring to FIGS. 17 and 18, hole former 40, whether or not same includes a straight wall or stepped configuration, may also include, at a lower or 6 o'clock position, a flattened or substantially planar area 73 such that, as the curvature of lesser diameter portion 42b approaches the lower or six o'clock position from radially adjacent three and nine o'clock positions, the outer diameter of portion 42b gradually approaches that of portion 42a. When opening 26 is formed in manhole 20 using hole former 40 of this embodiment, the lower portion of pipe 30 may rest against a flattened area at the lower portion of opening 26 that is formed by area 73 of the hole former 40 to receive and support the gravitational load of pipe 30, optionally also resulting in a greater sealing compression of gasket 28 in this region.

Figure 19A:
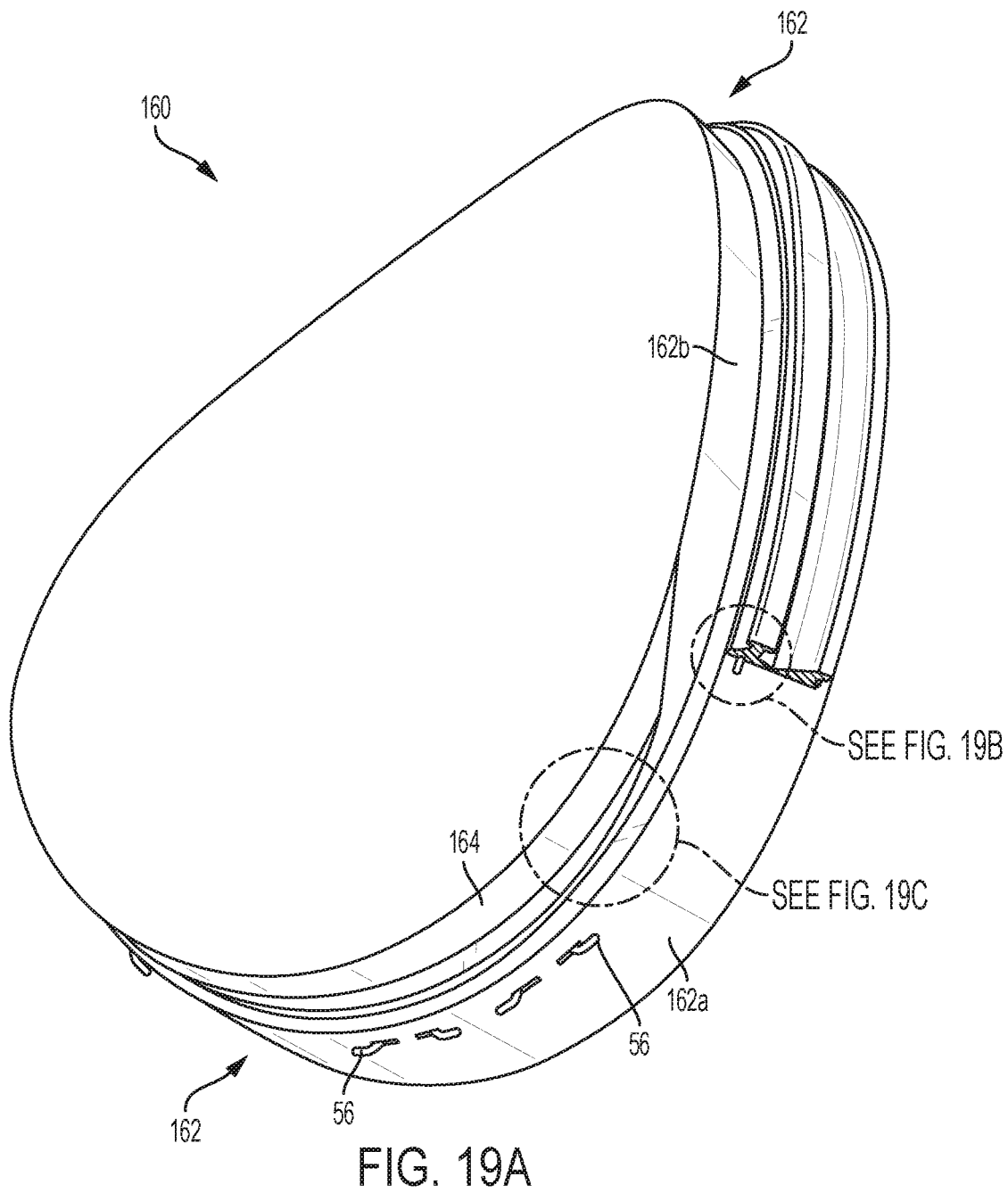
FIG. 19A is a perspective view of a hole former according to a further embodiment.
Figure 19B:
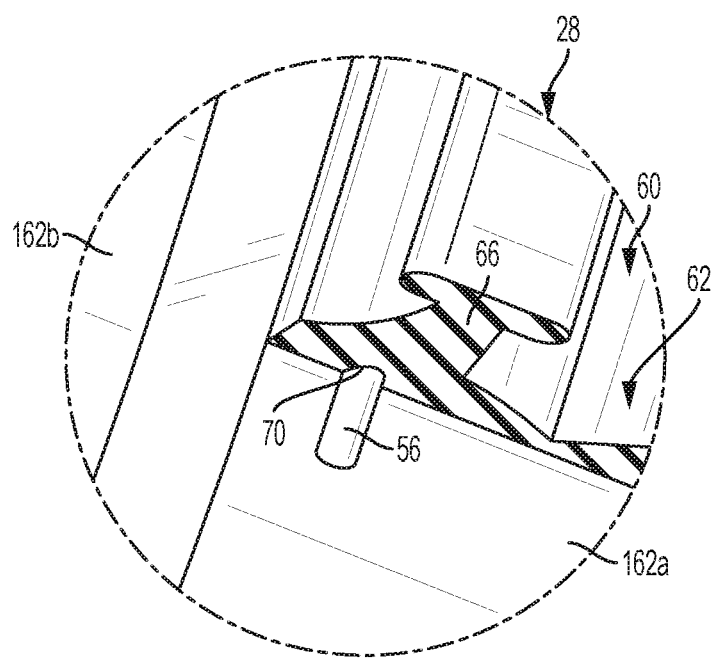
FIG. 19B is a fragmentary view of a portion of FIG. 19A.
Figure 19C:
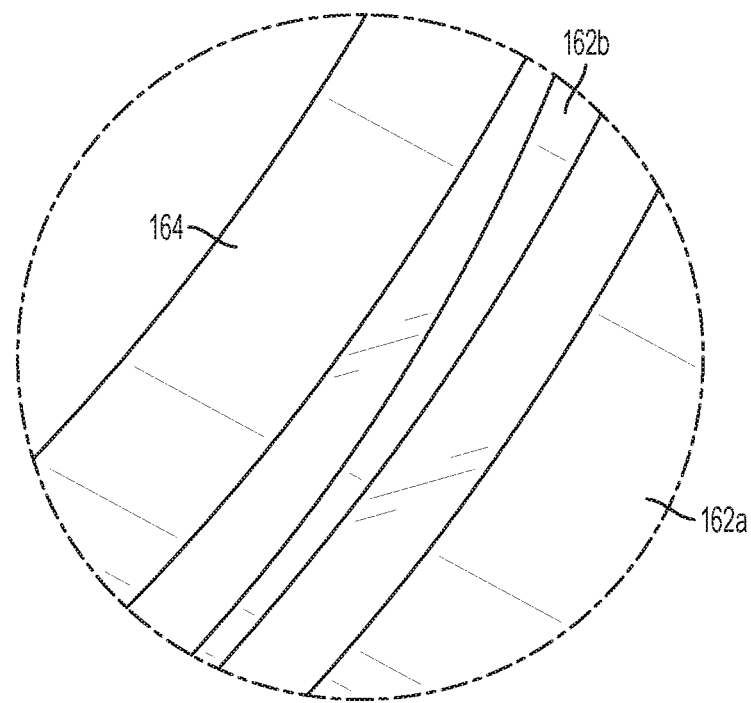
FIG. 19C is a fragmentary view of another portion of FIG. 19A.

FIGS. 19A-19C show a further embodiment of a hole former, shown as hole former 160 which, except as described below, is very similar to the hole formers described above, and the same reference numerals have been used to designate identical or similar features. Hole former 160 includes an outer wall 162 with a relatively larger diameter wall portion 162a to which gasket 28 is fitted as described above. Outer wall 162 of hole former 160 further includes a relatively smaller diameter wall portion 162b. Wall portion 162b further includes a stepped region 164 having a still smaller outer diameter which, as shown in FIG. 19, extends between about 110 degrees and 130 degrees around the outer periphery of the lower portion of hole former 160 from an approximate 4 o'clock position to an approximate 8 o'clock position.

Referring to 20a-20c, when hole former 160 is used to form opening 26 in wall 22 of manhole 20, in which gasket 28 is embedded within opening 26 as discussed above, the stepped region 164 of hole former 160 will form a corresponding recessed relief area 166 at the lower portion of opening 26. The advantage of relief area 166 will be discussed below with reference to FIGS. 20a-20c, which sequentially show pipe 30 initially approaching gasket 28 during installation (FIG. 20a), followed by initial contact of the outer surface of pipe 30 with gasket 28 (FIG. 20b), during which sealing portion 62 of gasket 28 begins to deform, and finally showing full engagement between the outer surface of pipe 30 and gasket 28 (FIG. 20c) in which gasket 28 is substantially fully deformed.

Figure 20C:
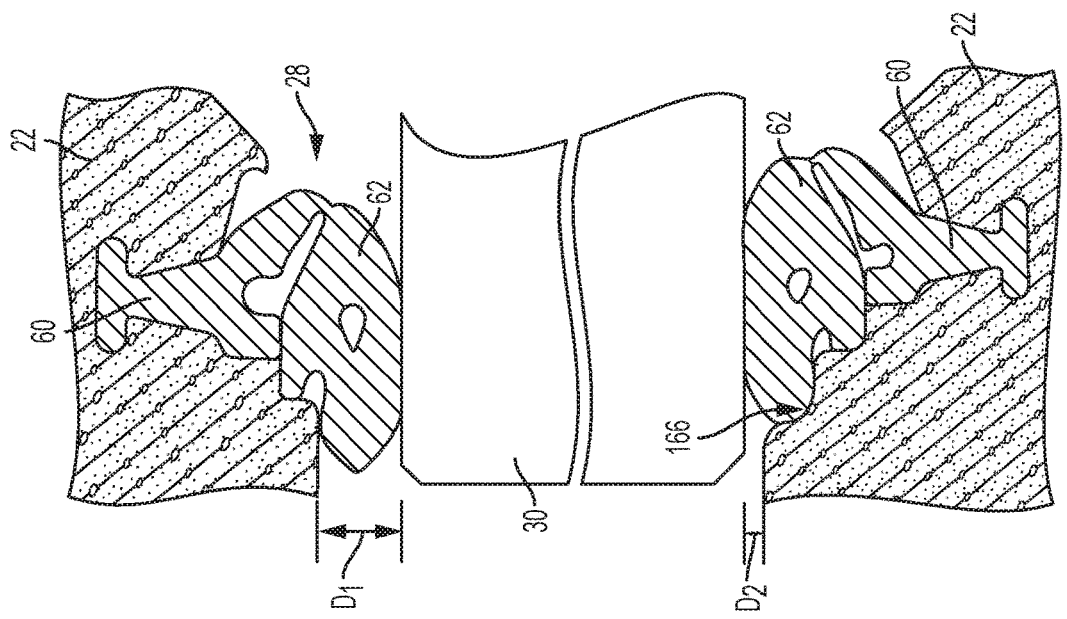
FIG. 20C is a continuation of FIG. 20B, showing full engagement of the pipe with the gasket.
Figure 20B:
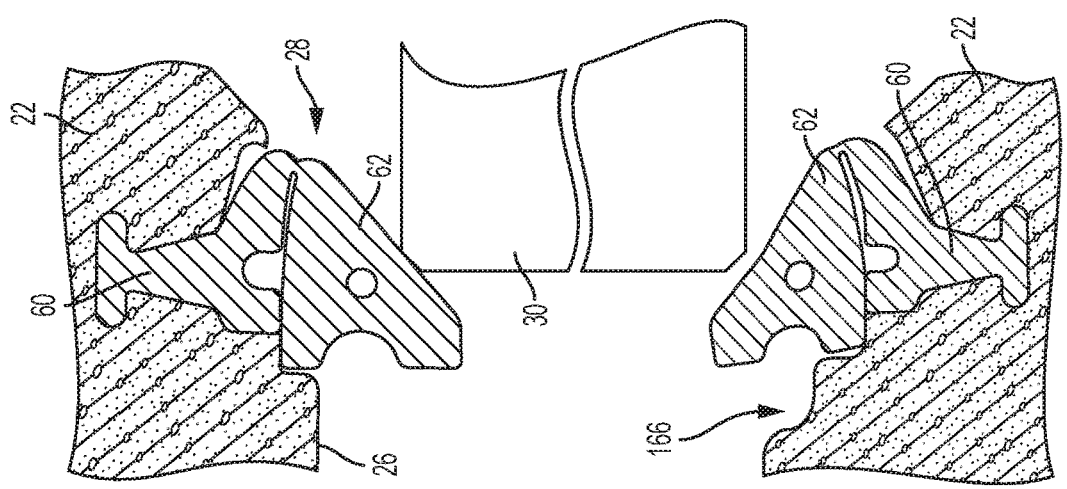
FIG. 20B is a continuation of FIG. 20A, further showing initial engagement of the pipe with the gasket.
Figure 20A:
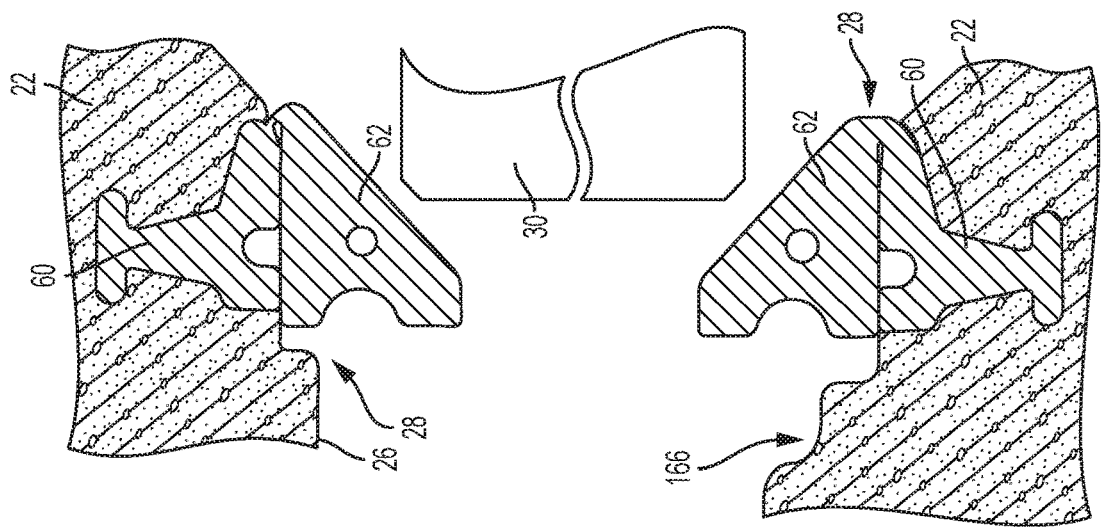
FIG. 20A is a sectional view of a manhole with embedded gasket, further showing approach of a pipe toward the gasket.

Referring to the upper portion of FIGS. 20a-20c, showing the upper portion of the pipe joint, upon engagement of sealing portion 62 of gasket 28 by pipe 30, sealing portion 62 is deformed between the outer surface of pipe 30 and both the anchoring portion 60 of gasket 28 and the inner surface of opening 26 to provide a compressive seal with pipe 30. Due to the weight of pipe 30, a relatively greater distance is present between the outer surface of the pipe and the inner surface of opening 26, shown in the upper portion of FIG. 20c as distance $D_1$. The relatively greater distance $D_1$ (as opposed to a relatively lesser corresponding distance $D_2$ at the lower end of the pipe joint, discussed below), is sufficiently small to accommodate radial compressive deformation of sealing portion 62 of gasket 28 to form a compressive seal. However, distance $D_1$ is also sufficiently large to prevent an "over compression" of gasket 28 by which, during installation of pipe 30, gasket 28 cannot seek area for expansion and may tend to become dislodged out of its position in a direction axially inwardly of manhole wall 22 due to friction with the outer surface of pipe 30 combined with lack of sufficient distance to accommodate radial compressive deformation of gasket 28.

Referring to the lower portion of FIGS. 20a-20c, showing the lower portion of the pipe joint, upon engagement of sealing portion 62 of gasket 28 by pipe 30, sealing portion 62 is deformed between the outer surface of pipe 30 and both the anchoring portion 60 of gasket 28 and the inner surface of opening 26 to provide a compressive seal with pipe 30. However, due to the weight of pipe 30, a relatively smaller distance $D_2$ is present between the outer surface of pipe 30 and the inner surface of opening 26. For this reason, relief area 166 is provided, in order to accommodate deformation of sealing portion 62 of gasket 28 in the manner shown in the lower portion of FIG. 20c to form a compressive seal and yet prevent the above described "over compression" of gasket 28 which might otherwise occur in the absence of relief area 166 due to the relatively smaller distance $D_2$.

Figure 21:
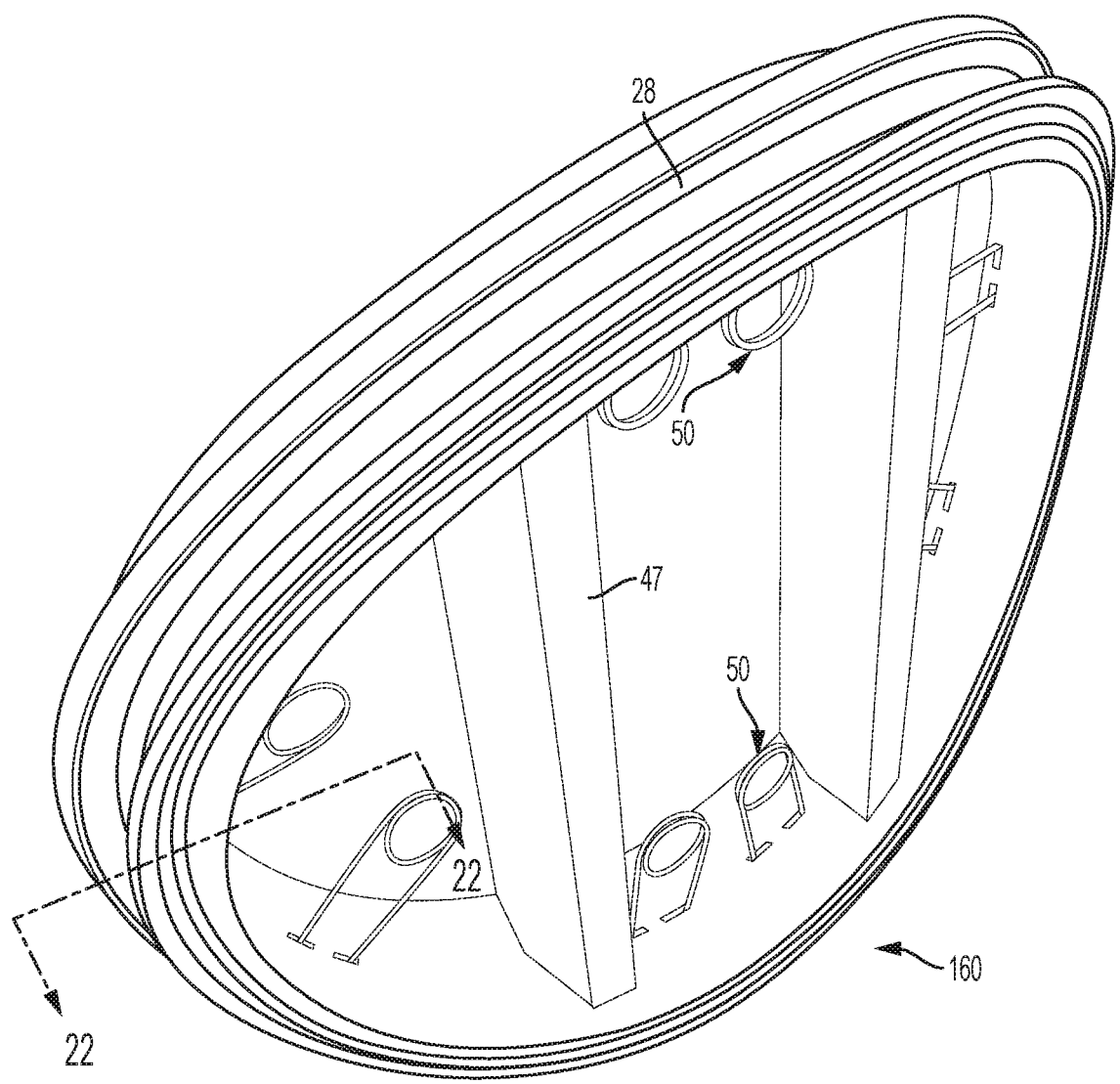
FIG. 21 is a perspective view of a hole former with attached gasket.
Figure 22:
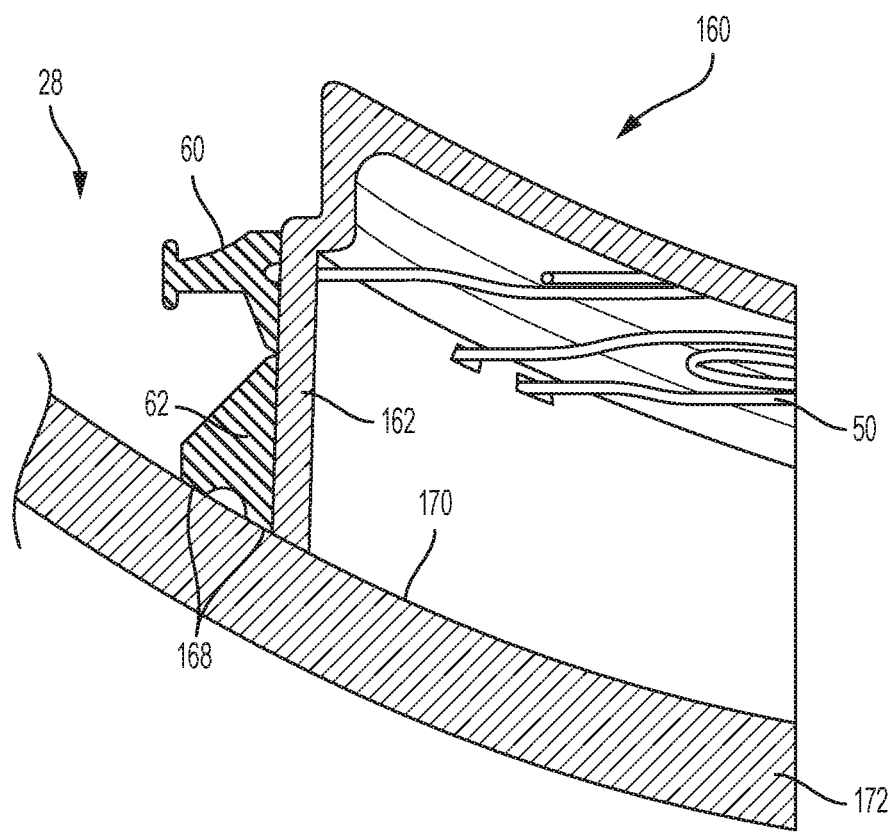
FIG. 22 is a sectional view of the hole former and gasket, taken along line 22-22 of FIG. 21, and further showing an outer form wall.

Referring to FIGS. 21 and 22, when gasket 28 is positioned on hole former 160 as described above, sealing portion 62 of gasket has a radial outer face 168 which may be slightly curved to align with the curved inner surface 170 of an outer form wall 172 of a casting structure during casting of manhole 20 as described above, with outer face 168 of sealing portion 62 disposed closely proximate, or in abutment with, curved inner surface 170 of outer form wall 172. In this manner, during assembly of the form structure, sealing portion 62 of gasket 28 remains in firm engagement with the outer wall 162 of hole former 160 casting, and outer face 168 of sealing portion 62 closely conforms to and follows the inner surface 170 of form wall 172. Therefore, sealing portion 62 is less likely to be engaged by form wall 172 during installation of the form assembly and casting in a manner in which sealing portion 62 may be moved away from or separated from the outer wall of hole former 160.

Figure 23:
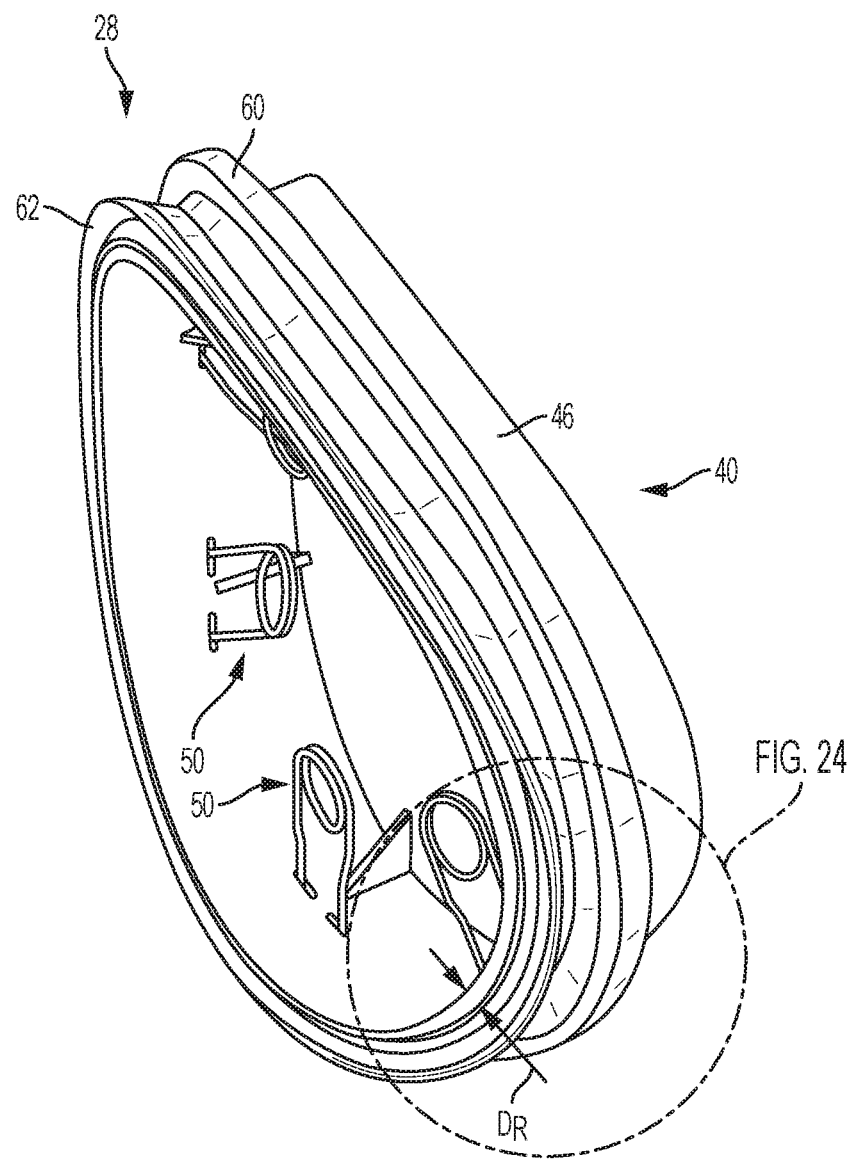
FIG. 23 is a perspective view of a gasket and hole former according to a further embodiment.
Figure 24:
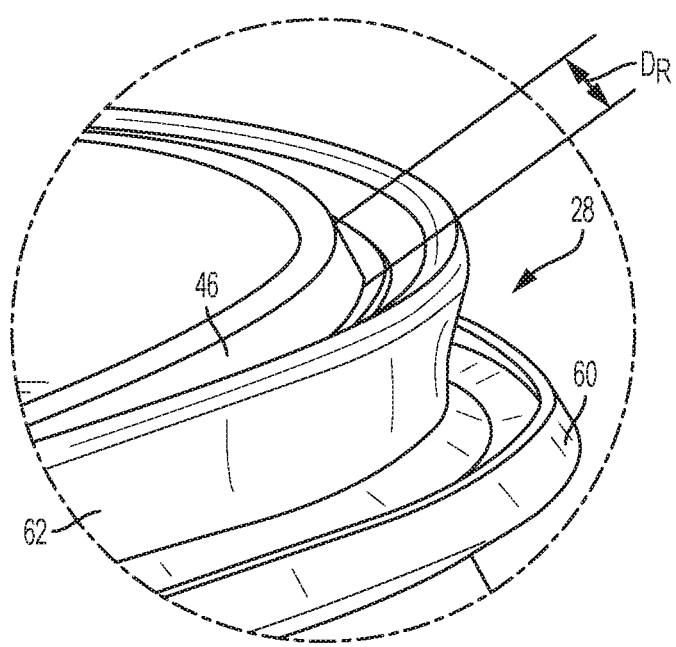
FIG. 24 is a fragmentary view of a portion of the gasket and hole former of FIG. 23.

Referring to FIGS. 23 and 24, potential interference of outer form wall 172 with sealing portion 62 of gasket 28 may also be accommodated by selectively controlling the axial positioning of certain portions of gasket 28 on hole former 160.

For example, as shown in FIG. 23, at substantially horizontally aligned locations corresponding to 3 o'clock and 9 o'clock positions of the gasket 28 and hole former 160, any of the gasket retention elements of the type described above may be selectively configured with respect to hole former 160 to axially position portions of gasket 28 in a non-flush, or spaced, orientation with respect to the front face $F_1$ of hole former 160 so that a recessed distance $D_R$ is present between the front face $F_1$ of hole former 160 and selected regions of sealing portion 62 of gasket 28.

As shown in FIG. 24, these recessed positions of gasket 28 corresponding to the distances $D_R$ may be located substantially at the 3 o'clock and 9 o'clock positions of the hole former/gasket assembly, and may also be gradually reduced circumferentially from such points around hole former 160 in directions approaching the 2 o'clock and the 4 o'clock positions from the 3 o'clock position, as well as directions approaching the 8 o'clock and the 10 o'clock positions from the 9 o'clock position.

In this manner, selected regions of sealing portion 62 of gasket 28, such as the regions located substantially at the 3 o'clock and 9 o'clock positions of the hole former/gasket assembly as shown, will not extend beyond front face $F_1$ of hole former 160 to thereby prevent interference between outer form wall 172 and sealing portion 62 of gasket 28 while also minimizing the corresponding spaces between outer form wall 172 and sealing portion 62 of gasket 28 to prevent concrete from passing between the foregoing interface during casting.

As used herein, the phrase "within any range defined between any two of the foregoing values" literally means that any range may be selected from any two of the values listed prior to such phrase regardless of whether the values are in the lower part of the listing or in the higher part of the listing. For example, a pair of values may be selected from two lower values, two higher values, or a lower value and a higher value.

While this disclosure has been described as having exemplary designs, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A hole former for use in casting a gasket within an opening of a structure, comprising:
   a body defining a central axis and including a substantially cylindrical outer peripheral surface having a length extending parallel to said central axis, said outer peripheral surface disposed at a first radial extent from said central axis;
   at least one gasket retention element projecting outwardly beyond said outer peripheral surface to a second radial extent from said central axis, said second radial extent greater than said first radial extent; and
   wherein said body of said hole former includes first and second opposite end faces curved along concentric arcs defined by respective aligned radii extending from a common second axis perpendicular to said central axis.

2. The hole former of claim 1, wherein said body of said hole former includes at least one gasket retention element interface, each said gasket retention element associated with a corresponding gasket retention element interface.

3. The hole former of claim 2, wherein at least one of said gasket retention element interfaces includes a hole in said substantially cylindrical outer peripheral surface, and at least one of said gasket retention elements is an end of a spring clip, said end projecting through said hole outwardly beyond said outer peripheral surface to said second radial extent.

4. The hole former of claim 2, wherein at least one of said gasket retention element interfaces includes a pair of holes in said substantially cylindrical outer peripheral surface, and at least one of said gasket retention elements is a pair of ends of a spring clip, said ends respectively projecting through said pair of holes outwardly beyond said outer peripheral surface to said second radial extent.

5. The hole former of claim 1, further comprising an annular gasket received on outer peripheral surface, said gasket mechanically interfacing with a respective said gasket retention element, whereby movement of said gasket with respect to said outer peripheral surface of said hole former along a direction of said axis is restricted.

6. The hole former of claim 5, wherein said gasket includes at least one recess engaging a respective said gasket retention element, whereby movement of said gasket with respect to said outer peripheral surface of said hole former along a direction of said axis is restricted.

7. The hole former of claim 1, wherein said body includes an outer wall having a first diameter and defining said outer peripheral surface, said outer wall defining a stepped region having a second, lesser diameter than said first diameter, and said stepped region extending partially around the outer periphery of a lower portion of said hole former.

8. A gasket and hole former assembly for use in casting a gasket within an opening of a structure, comprising:
   a hole former, comprising:
      a body defining a central axis and including a substantially cylindrical outer peripheral surface having a length extending parallel to said central axis, said outer peripheral surface disposed at a first radial extent from said central axis; and
      at least one gasket retention element projecting outwardly beyond said outer peripheral surface to a second radial extent from said central axis, said second radial extent greater than said first radial extent; and an annular gasket received on outer peripheral surface and including an annular anchoring portion projecting radially outwardly from said gasket, said anchoring portion adapted for embedment within concrete, said gasket mechanically interfacing with said gasket retention element, whereby movement of said gasket with respect to said outer peripheral surface of said hole former along a direction of said axis is restricted.

9. The assembly of claim 8, wherein said gasket includes at least one recess engaging a respective said gasket retention element, whereby movement of said gasket with respect to said outer peripheral surface of said hole former along a direction of said axis is restricted.

10. The assembly of claim 8, wherein said body of said hole former includes first and second opposite end faces curved along concentric arcs defined by respective aligned radii extending from a common second axis perpendicular to said central axis.

11. The assembly of claim 8, wherein said body of said hole former includes at least one gasket retention element interface, each said gasket retention element associated with a corresponding gasket retention element interface.

12. The assembly of claim 11, wherein at least one of said gasket retention element interfaces includes a hole in said substantially cylindrical outer peripheral surface, and at least one of said gasket retention elements is an end of a spring clip, said end projecting through said hole outwardly beyond said outer peripheral surface to said second radial extent.

13. The assembly of claim 8, wherein at least one of said gasket retention element interfaces includes a pair of holes in said substantially cylindrical outer peripheral surface, and at least one of said gasket retention elements is a pair of ends of a spring clip, said ends respectively projecting through said pair of holes outwardly beyond said outer peripheral surface to said second radial extent.

14. The assembly of claim 8, wherein said body of said hole former includes an outer wall having a first diameter and defining said outer peripheral surface, said outer wall defining a stepped region having a second, lesser diameter than said first diameter, and said stepped region extending partially around the outer periphery of a lower portion of said hole former.

15. The hole former of claim 5, wherein said gasket is retained on said hole former in a compound curved orientation corresponding to the curvature of said first and second end faces of said hole former.

16. The hole former of claim 5, wherein said gasket further includes an annular anchoring portion projecting radially outwardly from said gasket, said anchoring portion adapted for embedment within concrete.

17. The assembly of claim 6, wherein said recess is an annular recess extending around said gasket.

18. The assembly of claim 8, wherein said gasket includes an annular recess in which said gasket retention element is received.

19. The assembly of claim 10, wherein said gasket is retained on said hole former in a compound curved orientation corresponding to the curvature of said first and second end faces of said hole former.

* * * * *